US012430560B2

(12) United States Patent
Zang et al.

(10) Patent No.: US 12,430,560 B2
(45) Date of Patent: Sep. 30, 2025

(54) DISTRIBUTED SYNCHRONOUS TRAINING ARCHITECTURE USING STALE WEIGHTS

(71) Applicant: Huawei Technologies Co., Ltd., Guangdong (CN)

(72) Inventors: Hui Zang, Cupertino, CA (US); Xiaolin Cheng, San Ramon, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 1031 days.

(21) Appl. No.: 17/450,055

(22) Filed: Oct. 5, 2021

(65) Prior Publication Data

US 2022/0027738 A1 Jan. 27, 2022

Related U.S. Application Data

(63) Continuation of application No. PCT/US2019/031191, filed on May 7, 2019.

(51) Int. Cl.
*G06N 3/063* (2023.01)
*G06N 3/04* (2023.01)
*G06N 3/084* (2023.01)

(52) U.S. Cl.
CPC .............. *G06N 3/084* (2013.01); *G06N 3/04* (2013.01)

(58) Field of Classification Search
CPC .......... G06N 3/084; G06N 3/04; G06N 3/045; G06N 3/063
See application file for complete search history.

(56) References Cited

U.S. PATENT DOCUMENTS

| 10,949,746 B2* | 3/2021 | Haruki | ................. G06N 3/045 |
| 12,072,951 B2* | 8/2024 | Cardinaux | ............. G06F 17/16 |

(Continued)

FOREIGN PATENT DOCUMENTS

| CN | 104463324 A * | 3/2015 | ............... G06N 3/02 |
| WO | WO-2017201506 A1 * | 11/2017 | ............. G06N 3/044 |
| WO | WO-2020226634 A1 | 11/2020 | |

OTHER PUBLICATIONS

"International Application Serial No. PCT/US2019/031191, International Search Report mailed Jan. 24, 2020", 4 pgs.

(Continued)

*Primary Examiner* — Hassan Mrabi
(74) *Attorney, Agent, or Firm* — Schwegman Lundberg & Woessner, P.A.

(57) ABSTRACT

A computer-implemented method for distributed synchronous training of a neural network model includes performing, by a worker machine of a plurality of worker machines, a forward computation of a training data set using a plurality of N layers of the neural network model. The forward computation starts at Layer 1 and proceeds through Layer N of the neural network model. The method further includes performing, by the worker machine, a backward computation of the training data set, the backward computation starting at Layer N and proceeding through Layer 1 of the neural network model. The method further includes synchronizing, by the worker machine, a plurality of gradients outputted by the neural network model during the backward computation. The synchronizing of the plurality of gradients is performed with other worker machines of the plurality of worker machines and in parallel with the backward computation.

19 Claims, 16 Drawing Sheets

(56) References Cited

U.S. PATENT DOCUMENTS

| | | | |
|---|---|---|---|
| 2008/0319933 A1* | 12/2008 | Moussa | G06N 3/084 706/31 |
| 2017/0193361 A1* | 7/2017 | Chilimbi | G06N 3/084 |
| 2018/0075347 A1* | 3/2018 | Alistarh | G06N 3/084 |
| 2018/0121806 A1 | 5/2018 | Haruki et al. | |
| 2019/0042934 A1* | 2/2019 | Arunachalam | G06V 10/774 |
| 2019/0080233 A1* | 3/2019 | Procter | G06N 3/045 |
| 2019/0130110 A1* | 5/2019 | Lee | G06N 3/08 |
| 2019/0155620 A1* | 5/2019 | Arunachalam | G06N 3/04 |
| 2019/0303787 A1* | 10/2019 | Dube | G06N 20/00 |
| 2019/0324856 A1* | 10/2019 | Zhao | G06F 18/2148 |
| 2019/0325302 A1* | 10/2019 | Savic | G06N 3/08 |
| 2020/0042362 A1* | 2/2020 | Cui | G06V 10/82 |
| 2020/0118000 A1* | 4/2020 | Schmidt | G06F 9/546 |
| 2020/0174840 A1* | 6/2020 | Zhao | G06F 9/5011 |
| 2021/0374544 A1* | 12/2021 | Zang | G06N 3/063 |

OTHER PUBLICATIONS

"International Application Serial No. PCT/US2019/031191, Written Opinion mailed Jan. 24, 2020", 8 pgs.

Myle, Ott, et al., "Scaling Neural Machine Translation", arxiv.org, Cornell University Library, 201 Olin Library Cornell University Ithaca, NY 14853 (Jun. 30, 2018).

"International Application Serial No. PCT/US2019/031191, International Preliminary Report on Patentability mailed Nov. 18, 2021", 10 pgs.

* cited by examiner

DISTRIBUTED SYNCHRONOUS TRAINING ARCHITECTURE USING STALE WEIGHTS

CROSS-REFERENCE TO RELATED APPLICATIONS

This application is a continuation of International Application No. PCT/US2019/031191, filed on May 7, 2019, entitled "DISTRIBUTED SYNCHRONOUS TRAINING ARCHITECTURE USING STALE WEIGHTS," the benefit of priority of which is claimed herein, and which application is hereby incorporated herein by reference in its entirety.

TECHNICAL FIELD

The present disclosure is related to machine-learning model training Some aspects relate to improving the performance of training deep neural networks in a distributed synchronous setting with backup workers. Other aspects relate to a distributed synchronous training architecture using stale weights.

BACKGROUND

With successful applications of deep neural networks, the requirements for neural network size and data handling volume are increasing rapidly. Consequently, efficient training of those networks, especially in a distributed training environment, is particularly important.

In a distributed synchronous training environment for deep neural networks, gradient aggregation and distribution among workers (i.e., gradient communication), as well as the gradient update, run sequentially with back-propagation (or backward) computation. In this regard, the backward computation and gradient communication are not overlapped. In addition, weights from previous iterations are not leveraged during the computation processing.

SUMMARY

Various examples are now described to introduce a selection of concepts in a simplified form, which are further described below in the detailed description. The Summary is not intended to identify key or essential features of the claimed subject matter, nor is it intended to be used to limit the scope of the claimed subject matter.

According to a first aspect of the present disclosure, there is provided a computer-implemented method for distributed synchronous training of a neural network model. The method includes performing, by a worker machine of a plurality of worker machines in a deep-learning training architecture, a forward computation of a training data set using a plurality of N layers of the neural network model, the forward computation starting at Layer 1 and proceeding through Layer N of the neural network model. The method further includes performing, by the worker machine, a backward computation of the training data set, the backward computation starting at Layer N and proceeding through Layer 1 of the neural network model. The method further includes synchronizing, by the worker machine, a plurality of gradients output by the neural network model during the backward computation. The synchronizing of the plurality of gradients is performed with other worker machines of the plurality of worker machines and in parallel with the backward computation.

In a first implementation form of the method according to the first aspect as such, the forward computation and the backward computation are performed for a current iteration i of the training data set, where Layers 2 through N use weights updated from the plurality of gradients as synchronized in iteration (i−1), and Layer 1 uses weights updated from the plurality of gradients as synchronized in iteration (i−2).

In a second implementation form of the method according to the first aspect as such or any preceding implementation form of the first aspect, the forward computation, and the backward computation are performed for a current iteration i of the training data set, where a first portion of the plurality of gradients are synchronized in iteration (i−1), and a second remaining portion of the plurality of gradients are synchronized in iteration (i−2).

In a third implementation form of the method according to the first aspect as such or any preceding implementation form of the first aspect, the forward computation and the backward computation are performed for a current iteration i of the training data set, where the plurality of gradients used for updating weights for the forward computation and the backward computation are synchronized in iteration (i−2).

In a fourth implementation form of the method according to the first aspect as such or any preceding implementation form of the first aspect, the forward computation and the backward computation are performed for a current iteration i of the training data set, where the plurality of gradients used for updating weights for the forward computation and the backward computation are synchronized in iteration (i−1).

In a fifth implementation form of the method according to the first aspect as such or any preceding implementation form of the first aspect, the forward computation and the backward computation are performed for a subsequent iteration (i+1) of the training data set, subsequent to completion of the synchronizing of the plurality of gradients.

In a sixth implementation form of the method according to the first aspect as such or any preceding implementation form of the first aspect, the synchronizing of the plurality of gradients further including performing gradient aggregation using the plurality of gradients to generate aggregated gradients, and updating the neural network model using the aggregated gradients.

In a seventh implementation form of the method according to the first aspect as such or any preceding implementation form of the first aspect, the aggregated gradients are averaged to generate averaged gradients, and a plurality of weights of the neural network model are updated using the averaged gradients.

In an eighth implementation form of the method according to the first aspect as such or any preceding implementation form of the first aspect, the plurality of worker machines are coupled in a ring topology.

According to a second aspect of the present disclosure, there is provided a distributed synchronous training system for training a neural network model, including a plurality of worker machines coupled to each other, each worker machine of the plurality of worker machines including a memory storing instructions and one or more processors in communication with the memory. The one or more processors execute the instructions to perform a forward computation of a training data set using a plurality of N layers of the neural network model, the forward computation starting at Layer 1 and proceeding through Layer N of the neural network model. A backward computation of the training data set is performed, the backward computation starting at Layer N and proceeding through Layer 1 of the neural network model. The worker machine synchronizes a plurality of gradients output by the neural network model during the backward computation. The synchronizing of the plurality of gradients is performed with other worker machines of the plurality of worker machines and in parallel with the backward computation.

In a first implementation form of the distributed synchronous training system according to the second aspect as such, the one or more processors are further configured to perform the forward computation and the backward computation for a current iteration i of the training data set. Layers 2 through N use weights updated from the plurality of gradients as synchronized in iteration (i−1), and Layer 1 uses weights updated from the plurality of gradients as synchronized in iteration (i−2).

In a second implementation form of the distributed synchronous training system according to the second aspect as such or any preceding implementation form of the second aspect, the one or more processors are further configured to perform the forward computation and the backward computation for a current iteration i of the training data set. A first portion of the plurality of gradients are synchronized in iteration (i−1), and a second remaining portion of the plurality of gradients are synchronized in iteration (i−2).

In a third implementation form of the distributed synchronous training system according to the second aspect as such or any preceding implementation form of the second aspect, the one or more processors are further configured to perform the forward computation and the backward computation for a current iteration i of the training data set, wherein the plurality of gradients used for updating weights for the forward computation and the backward computation are synchronized in iteration (i−2).

In a fourth implementation form of the distributed synchronous training system according to the second aspect as such or any preceding implementation form of the second aspect, wherein the one or more processors are further configured to perform the forward computation and the backward computation for a current iteration i of the training data set, wherein the plurality of gradients used for updating weights for the forward computation and the backward computation are synchronized in iteration (i−1).

In a fifth implementation form of the distributed synchronous training system according to the second aspect as such or any preceding implementation form of the second aspect, the one or more processors are further configured to perform the forward computation and the backward computation for a subsequent iteration (i+1) of the training data set, subsequent to completion of the synchronizing of the plurality of gradients.

In a sixth implementation form of the distributed synchronous training system according to the second aspect as such or any preceding implementation form of the second aspect, in synchronizing the plurality of gradients, the one or more processors are further configured to perform gradient aggregation using the plurality of gradients to generate aggregated gradients and update the neural network model using the aggregated gradients.

In a sixth implementation form of the distributed synchronous training system according to the second aspect as such or any preceding implementation form of the second aspect, where the plurality of worker machines are coupled in a ring topology.

According to a third aspect of the present disclosure, there is provided a non-transitory computer-readable medium storing instruction for training a neural network model, that when executed by one or more processors of a worker machine of a plurality of worker machines in a deep-learning training architecture, cause the one or more processors to perform operations. The operations include performing a forward computation of a training data set using a plurality of N layers of the neural network model, the forward computation starting at Layer 1, and proceeding through Layer N of the neural network model. The operations further include performing a backward computation of the training data set, the backward computation starting at Layer N, and proceeding through Layer 1 of the neural network model. The operations further include synchronizing, with other worker machines of the plurality of worker machines and in parallel with the backward computation, a plurality of gradients output by the neural network model during the backward computation.

In a first implementation form of the non-transitory computer-readable medium according to the third aspect as such, the operations further including performing the forward computation and the backward computation for a current iteration i of the training data set, where Layers 2 through N use weights updated from the plurality of gradients as synchronized in iteration (i−1), and Layer 1 uses weights updated from the plurality of gradients as synchronized in iteration (i−2).

In a second implementation form of the non-transitory computer-readable medium according to the third aspect as such or any preceding implementation form of the third aspect, the operations further include performing the forward computation and the backward computation for a current iteration i of the training data set, wherein a first portion of the plurality of gradients are synchronized in iteration (i−1), and a second remaining portion of the plurality of gradients are synchronized in iteration (i−2).

In a third implementation form of the non-transitory computer-readable medium according to the third aspect as such or any preceding implementation form of the third aspect, the operations further include performing the forward computation and the backward computation for a current iteration i of the training data set, wherein the plurality of gradients used for updating weights for the forward computation and the backward computation are synchronized in iteration (i−2).

In a fourth implementation form of the non-transitory computer-readable medium according to the third aspect as such or any preceding implementation form of the third aspect, the operations further include performing the forward computation and the backward computation for a current iteration i of the training data set, the plurality of gradients used for updating weights for the forward computation and the backward computation are synchronized in iteration (i−1).

In a fifth implementation form of the non-transitory computer-readable medium according to the third aspect as such or any preceding implementation form of the third aspect, the operations further include performing the forward computation and the backward computation for a subsequent iteration (i+1) of the training data set, subsequent to completion of the synchronizing of the plurality of gradients.

In a sixth implementation form of the non-transitory computer-readable medium according to the third aspect as such or any preceding implementation form of the third aspect, the operations further include performing gradient aggregation using the plurality of gradients to generate aggregated gradients and updating the neural network model using the aggregated gradients.

In a seventh implementation form of the non-transitory computer-readable medium according to the third aspect as such or any preceding implementation form of the third aspect, the operations further include averaging the aggregated gradients to generate averaged gradients and updating a plurality of weights of the neural network model using the averaged gradients.

In an eighth implementation form of the non-transitory computer-readable medium according to the third aspect as such or any preceding implementation form of the third aspect, the operations further include performing parallel updating of the neural network model by updating the plurality of weights using the averaged gradients in parallel with the backward computation of the training data set.

According to a fourth aspect of the present disclosure, there is provided a distributed synchronous training system for training a neural network model. The system includes a plurality of worker machines coupled to each other. Each worker machine of the plurality of worker machines includes a forward computation means for performing a forward computation of a training data set using a plurality of N layers of the neural network model, the forward computation starting at Layer 1 and proceeding through Layer N of the neural network model. Each worker machine of the plurality of worker machines includes a backward computation means for performing a backward computation of the training data set, the backward computation starting at Layer N and proceeding through Layer 1 of the neural network model. Each worker machine of the plurality of worker machines includes synchronization means for performing synchronizing, by the worker machine, a plurality of gradients output by the neural network model during the backward computation, the synchronizing of the plurality of gradients performed with other worker machines of the plurality of worker machines and in parallel with the backward computation.

Any of the foregoing examples may be combined with any one or more of the other foregoing examples to create a new embodiment within the scope of the present disclosure.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

DETAILED DESCRIPTION

Figure 1:
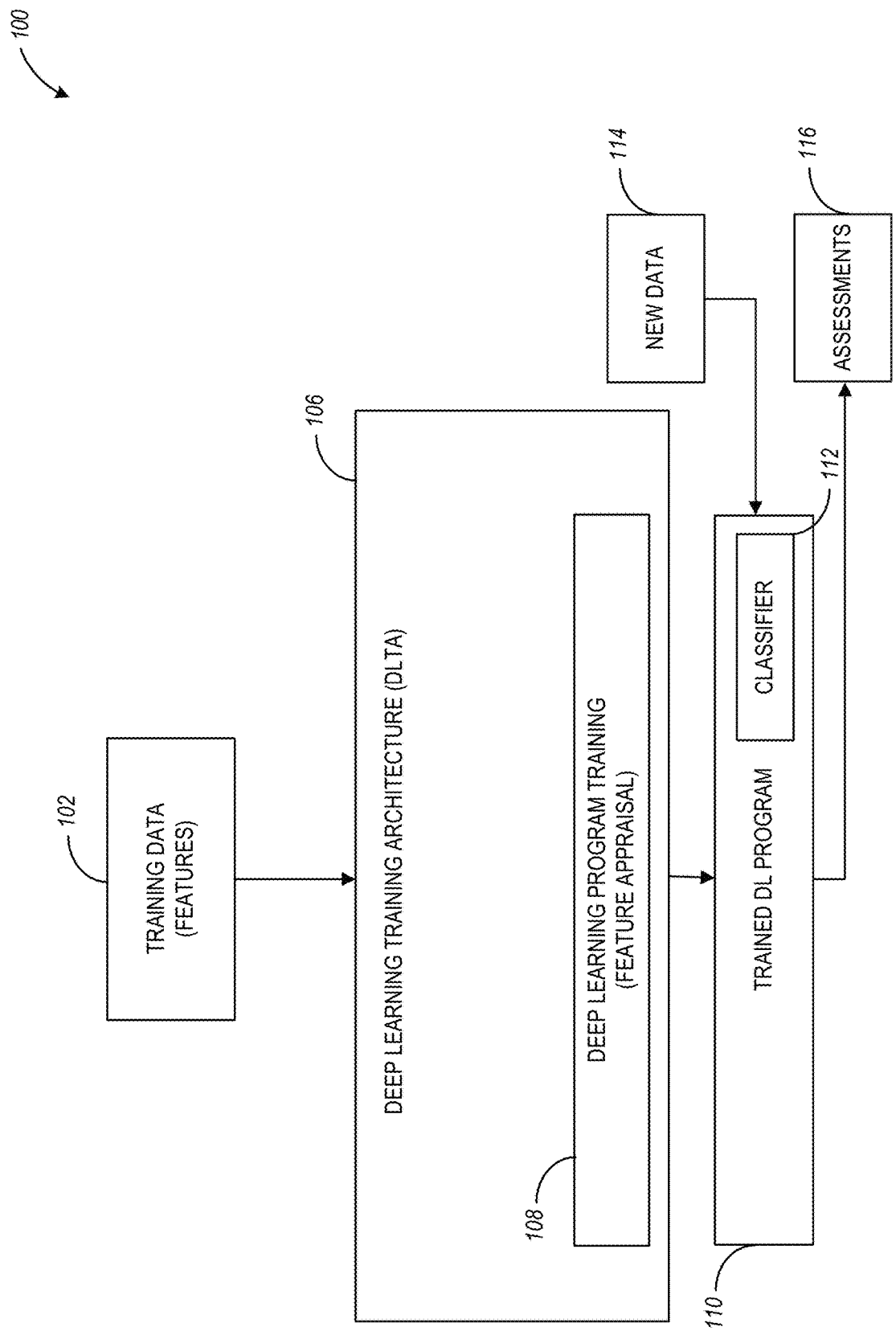
FIG. 1 is a block diagram illustrating the training of a deep learning (DL) program using a DL training architecture (DLTA), according to some example embodiments.

It should be understood at the outset that although an illustrative implementation of one or more embodiments is provided below, the disclosed systems and/or methods described with respect to FIGS. 1-14 may be implemented using any number of techniques, whether currently known or not yet in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In the following description, reference is made to the accompanying drawings that form a part hereof, and in which are shown, by way of illustration, specific embodiments which may be practiced. These embodiments are described in sufficient detail to enable those skilled in the art to practice the inventive subject matter, and it is to be understood that other embodiments may be utilized, and that structural, logical, and electrical changes may be made without departing from the scope of the present disclosure. The following description of example embodiments is, therefore, not to be taken in a limiting sense, and the scope of the present disclosure is defined by the appended claims.

As used herein, the term "worker" refers to a worker machine that is part of a DLTA together with other workers. In some aspects, the worker machines are all coupled to each other (e.g., in a ring topology). Gradients can be exchanged between the worker machines and each worker machine can perform its gradient averaging and gradient updates (e.g., gradient synchronization). As used herein, the terms "worker" and "worker machine" are interchangeable.

A gradient is a measurement of how much output of a worker machine changes per a change to the weights of the model that the worker machine is computing. A gradient measures a change in all weights with regard to the change in error. The larger the gradient value, the faster a model can learn.

As used herein, the terms "forward computation" and "backward computation" refer to computations performed in connection with the training of a neural network model (or another type of model). The computations performed during forward and backward computations modify weights based on results from prior iterations (e.g., based on gradients generated at a conclusion of a prior backward computation). In a distributed synchronous training environment for deep neural networks, gradient aggregations, averaging, and distribution among workers for purposes of neural network model weights update (i.e., gradient synchronization, also known as "AllReduce") can run sequentially with back-propagation (i.e., neural network model layer processing during backward computation). In this regard, computation processes (i.e., forward and backward computations) and gradient synchronization are not overlapped. In addition, weights from previous iterations are not leveraged during a current iteration of a training data set.

In current state-of-art deep learning frameworks (e.g. TensorFlow and MXNet), only a parameter server is implemented in either synchronous or asynchronous mode. The parameter server uses point-to-point communications (e.g., to multiple worker machines) to transport gradients from the workers to the parameter server, which point-to-point communications may be inefficient. Additionally, Baidu Research has previously proposed a ring-based "AllReduce" algorithm that can be used in deep training frameworks. However, the proposed algorithm does not consider parallel gradient synchronization with back-propagation (i.e., performing gradient synchronization in parallel with the backward computation process). Furthermore, the proposed Baidu Research algorithm does not leverage stale weights from previous iterations (gradient synchronization of a current iteration has to be finished to proceed with the next iteration, with the next iteration using only the gradients computed in the current iteration). As used herein, the term "back-propagation" refers to a backward computation performed by a worker machine. As used herein, the term "stale weights" refers to weights that have been determined during one or more prior iterations of the training data.

Techniques disclosed herein use gradient synchronization that is performed in parallel with the backward computation during a current iteration of the training data set. For example, gradient synchronization of iteration i starts once the back-propagation computation of gradients of Layer N finishes (i.e., the backward computation for Layer N finishes). In this regard, gradient synchronization is in parallel with the back-propagation of Layer N−1 through Layer 1. When the forward computation of the subsequent iteration (i+1) starts, the gradient synchronization from iteration i has not finished (e.g., gradient synchronization for Layer 1 has not finished). In this regard, the forward computation for the subsequent iteration can use stale weights (e.g., gradients from prior iterations) during the Layer 1 computations. Consequently, by leveraging stale weights from previous iterations, the training process of the neural network model is further accelerated.

Additional advantages of the techniques disclosed herein include the following: parallelization of gradient synchronization with back-propagation can significantly reduce training time by hiding communication time of gradients into computation time of gradients, and leveraging stale weights for certain layers can further accelerate forward computation and improve training performance In compari-son, prior art techniques (as mentioned above) disclose gradient updates but only serial updates (i.e., gradient synchronization is performed after the forward and backward computations have finished). Additionally, the prior art techniques require the use of a parameter server. In summary, prior art techniques do not discuss using gradient synchronization performed in parallel with backward computation in machine learning architectures, including ring topologies without a parameter server.

FIG. 1 is a block diagram 100 illustrating the training of a deep learning (DL) program 110 using a DL training architecture (DLTA), according to some example embodiments. In some example embodiments, machine-learning programs (MLPs), including deep learning programs, also collectively referred to as machine-learning algorithms or tools, are utilized to perform operations associated with correlating data or other artificial intelligence (AI)-based functions.

As illustrated in FIG. 1, deep learning program training 108 can be performed within the deep-learning training architecture (DLTA) 106 based on training data 102 (which can include features). During the deep learning program training 108, features from the training data 102 can be assessed for purposes of further training of the DL program. The DL program training 108 results in a trained DL program 110 which can include one or more classifiers 112 that can be used to provide assessments 116 based on new data 114.

Deep learning is part of machine learning, which is a field of study that gives computers the ability to learn without being explicitly programmed. Machine learning explores the study and construction of algorithms, also referred to herein as tools, that may learn from existing data, may correlate data, and may make predictions about new data. Such machine learning tools operate by building a model from example training data (e.g., 102) to make data-driven predictions or decisions expressed as outputs or assessments 116. Although example embodiments are presented with respect to a few machine-learning tools (e.g., a deep learning training architecture), the principles presented herein may be applied to other machine learning tools.

In some example embodiments, different machine learning tools may be used. For example, Logistic Regression (LR), Naive-Bayes, Random Forest (RF), neural networks (NN), matrix factorization, and Support Vector Machines (SVM) tools may be used during the program training process 108 (e.g., for correlating the training data 102).

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number). In some embodiments, the DLTA 106 can be configured to use machine learning algorithms that utilize the training data 102 to find correlations among identified features that affect the outcome.

The machine learning algorithms utilize features from the training data 102 for analyzing the new data 114 to generate the assessments 116. The features include individual measurable properties of a phenomenon being observed and used for training the ML program. The concept of a feature is related to that of an explanatory variable used in statistical techniques such as linear regression. Choosing informative, discriminating, and independent features is important for the effective operation of the MLP in pattern recognition, classification, and regression. Features may be of different types, such as numeric features, strings, and graphs. In some aspects, training data can be of different types, with the features being numeric for use by a computing device.

In some aspects, the features used during the DL program training 108 can include one or more of the following: sensor data from a plurality of sensors (e.g., audio, motion, image sensors); actuator event data from a plurality of actuators (e.g., wireless switches or other actuators); external information source from a plurality of external sources; timer data associated with the sensor state data (e.g., time sensor data is obtained), the actuator event data, or the external information source data; user communications information; user data; user behavior data, and so forth.

The machine learning algorithms utilize the training data 102 to find correlations among the identified features that affect the outcome of assessments 116. In some example embodiments, the training data 102 includes labeled data, which is known data for one or more identified features and one or more outcomes. With the training data 102 (which can include identified features), the DL program is trained using the DL program training 108 within the DLTA 106. The result of the training is the trained DL program 110. When the DL program 110 is used to perform an assessment, new data 114 is provided as an input to the trained DL program 110, and the DL program 110 generates the assessments 116 as an output.

Figure 2:
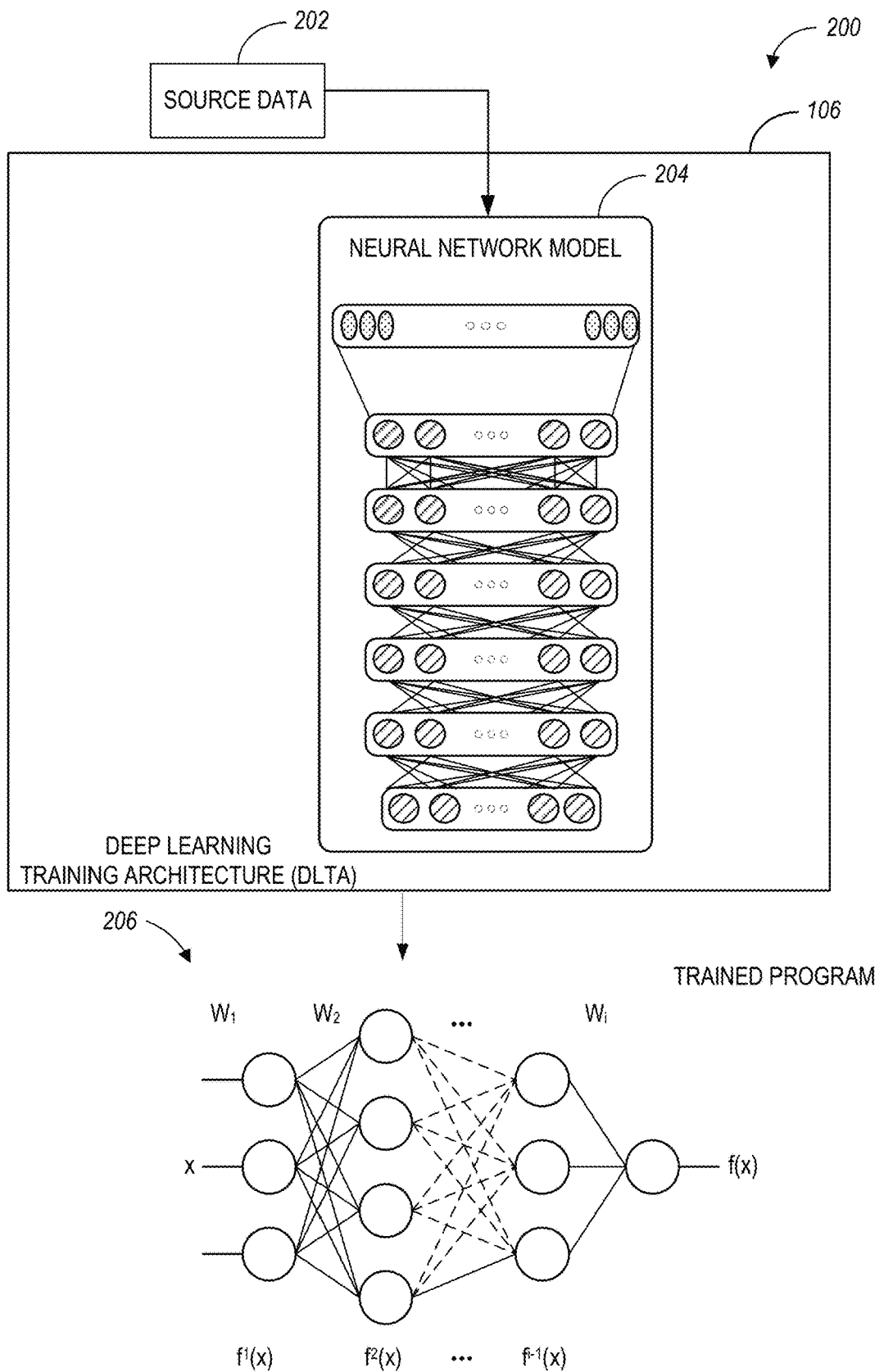
FIG. 2 is a diagram illustrating the generation of a trained DL program using a neural network model trained within a DLTA, according to some example embodiments.

FIG. 2 is a diagram 200 illustrating the generation of a trained DL program 206 using a neural network model 204 trained within a DLTA 106, according to some example embodiments. Referring to FIG. 2, source data 202 can be analyzed by a neural network model 204 (or another type of a machine learning algorithm or technique) to generate the trained DL program 206 (which can be the same as the trained DL program 110). The source data 202 can include a training set of data, such as 102, including data identified by one or more features. As used herein, the terms "neural network" and "neural network model" are interchangeable.

Machine learning techniques train models to accurately make predictions on data fed into the models (e.g., what was said by a user in a given utterance; whether a noun is a person, place, or thing; what the weather will be like tomorrow). During a learning phase, the models are developed against a training dataset of inputs to optimize the models to correctly predict the output for a given input. Generally, the learning phase may be supervised, semi-supervised, or unsupervised; indicating a decreasing level to which the "correct" outputs are provided in correspondence to the training inputs. In a supervised learning phase, all of the outputs are provided to the model and the model is directed to develop a general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs, in which the training dataset is repeatedly fed into the model to refine its results (i.e., the entire dataset is processed during an epoch). During an iteration, the model (e.g., a neural network model or another type of machine learning model) is run against a mini-batch (or a portion) of the entire dataset. In a supervised learning phase, a model is developed to predict the output for a given set of inputs (e.g., source data 202) and is evaluated over several epochs to more reliably provide the output that is specified as corresponding to the given input for the greatest number of inputs for the training dataset. In another example, for an unsupervised learning phase, a model is developed to cluster the dataset into n groups and is evaluated over several epochs as to how consistently it places a given input into a given group and how reliably it produces the n desired clusters across each epoch.

Once an epoch is run, the models are evaluated, and the values of their variables (e.g., weights, biases, or other parameters) are adjusted to attempt to better refine the model iteratively. As used herein, the term "weights" is used to refer to the parameters used by a machine learning model. During a backward computation, a model can output gradients, which can be used for updating weights associated with a forward computation.

In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to the desired result, but as the training dataset may be varied, and is preferably very large, perfect accuracy and precision may not be achievable. A number of epochs that make up a learning phase, therefore, may be set as a given number of trials or a fixed time/computing budget or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine the accuracy of the model in handling data that has not been trained on. In a second example, a false positive rate or false-negative rate may be used to evaluate the models after finalization. In a third example, a delineation between data clusters in each model is used to select a model that produces the clearest bounds for its clusters of data.

In some example embodiments, the DL program 206 is trained by a neural network model 204 (e.g., deep learning, deep convolutional, or recurrent neural network), which comprises a series of "neurons," such as Long Short Term Memory (LS™) nodes, arranged into a network. A neuron is an architectural element used in data processing and artificial intelligence, particularly machine learning, that includes memory that may determine when to "remember" and when to "forget" values held in that memory based on the weights of inputs provided to the given neuron. Each of the neurons used herein is configured to accept a predefined number of inputs from other neurons in the network to provide relational and sub-relational outputs for the content of the frames being analyzed. Individual neurons may be chained together and/or organized into tree structures in various configurations of neural networks to provide interactions and relationship learning modeling for how each of the frames in an utterance is related to one another.

For example, an LS™ serving as a neuron includes several gates to handle input vectors (e.g., phonemes from an utterance), a memory cell, and an output vector (e.g., contextual representation). The input gate and output gate control the information flowing into and out of the memory cell, respectively, whereas forget gates optionally remove information from the memory cell based on the inputs from linked cells earlier in the neural network. Weights and bias vectors for the various gates are adjusted throughout a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

Neural networks utilize features for analyzing the data to generate assessments (e.g., recognize units of speech). A feature is an individual measurable property of a phenomenon being observed. The concept of the feature is related to that of an explanatory variable used in statistical techniques such as linear regression. Further, deep features represent the output of nodes in hidden layers of the deep neural network.

A neural network, sometimes referred to as an artificial neural network or a neural network model, is a computing system based on consideration of biological neural networks of animal brains. Such systems progressively improve performance, which is referred to as learning, to perform tasks, typically without task-specific programming. For example, in image recognition, a neural network may be taught to identify images that contain an object by analyzing example images that have been tagged with a name for the object and, having learned the object and name, may use the analytic results to identify the object in untagged images A neural network is based on a collection of connected units called neurons, where each connection between neurons, called a synapse, can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In the training of a DNN architecture, a regression, which is structured as a set of statistical processes for estimating the relationships among variables, can include the minimization of a cost function. The cost function may be implemented as a function to return a number representing how well the neural network performed in mapping training examples to correct output. In training, if the cost function value is not within a predetermined range, based on the known training images, backpropagation is used, where backpropagation is a common method of training artificial neural networks that are used with an optimization method such as stochastic gradient descent (SGD) method.

The use of backpropagation can include propagation and weight updates. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backward, starting from the output, until each node has an associated error value that roughly represents its contribution to the original output. Backpropagation can use these error values to calculate the gradient of the cost function with respect to the weights in the neural network. The calculated gradient is fed to the selected optimization method to update the weights to attempt to minimize the cost function.

Even though the training architecture 106 is referred to as a deep learning training architecture using a neural network model (and the program that is trained is referred to as a trained deep learning program, such as 110 or 206), the disclosure is not limited in this regard and other types of machine learning training architectures may also be used for model training, using the techniques disclosed herein.

Figure 3:
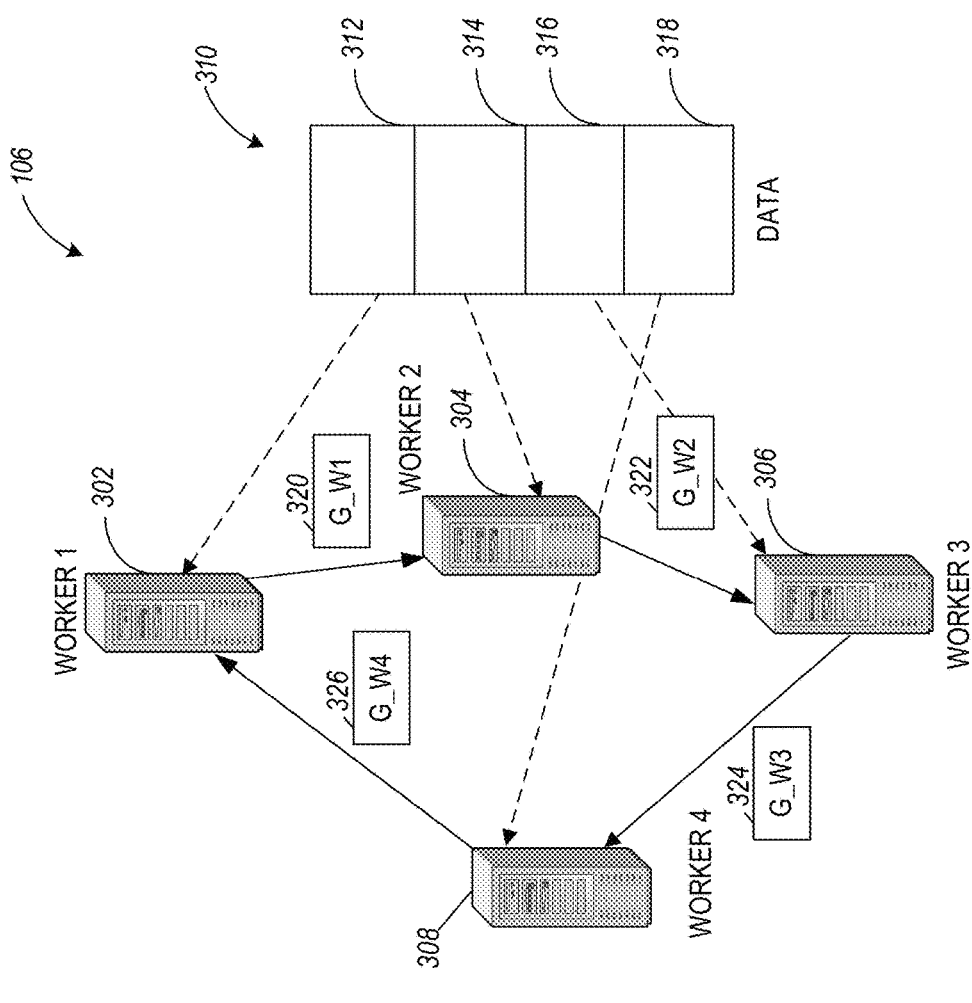
FIG. 3 is a diagram illustrating a DLTA for distributed synchronous training of a neural network model using a plurality of workers in a ring topology, according to some example embodiments.

FIG. 3 is a diagram illustrating an example DLTA 106 for distributed synchronous training of a neural network model using a plurality of workers in a ring topology, according to some example embodiments. Referring to FIG. 3, the DLTA 106 includes workers 302, 304, 306, and 308 coupled to each other. In some aspects and as illustrated in FIG. 3, the workers 302-308 are coupled in a ring topology, without the use of a parameter server. The DLTA 106 can use data parallelism, where training data 310 is split into corresponding data portions 312, 314, 316, and 318 for use by workers 302, 304, 306, and 308, respectively.

Each of the workers 302-308 uses the same neural network model, such as 328, for training. Additionally, each of the workers 302-308 includes a DLTA function management module (e.g., 332) and a gradient management module (e.g., 330) that perform functionalities further described herein below.

In operation, after each iteration of their corresponding data portions, each of the workers can report updated parameters, or gradients, to a neighboring worker. For example, workers 302, 304, 306, and 308 perform the first iteration on data portions 312, 314, 316, and 318 respectively, to generate gradients 320, 322, 324, and 326 at the end of the first iteration of the data. Gradients 320, 322, 324, and 326 are then communicated by workers 302, 304, 306, and 308 to a respective neighboring worker 304, 306, 308, and 302 (e.g., via a push communication, as illustrated in FIG. 3).

The communication exchange of gradients in the ring topology continues until each worker has the updated gradients from all remaining workers. Each of the workers then performs gradient aggregation and averaging at the end of the first iteration, using the received gradients from the remaining workers. As a result of the gradient aggregation and averaging, each worker updates the parameters (e.g., gradient synchronization) of the neural network model (e.g., neural network model 328 which can be globally available to all workers). Even though the DLTA 106 is illustrated as including only four workers in a ring topology, the disclosure is not limited in this regard and a different number of workers coupled in a different topology can be utilized within the DLTA 106.

In some aspects, each of the workers 302-308 in the DLTA 106 can further include a DLTA function management module and a gradient management module (examples of such modules used by worker 308 are referenced as 332 and 330). The DLTA function management module 332 may comprise suitable circuitry, logic, interfaces, and/or code and is configured to perform functionalities associated with training the model used by the worker (e.g., neural network model 328 as used by worker 308) as well as managing communications between the worker 308 and the remaining workers in the DLTA 106. In some aspects, an indication of which model to use can be communicated to each worker by a parameter server, a management node, or can be selected via a mutual agreement between all workers. Additionally, the DLTA function management module 332 is configured to manage communications between the workers, including communicating gradients (e.g., as obtained after a backward computation) between the workers.

The gradient management module 330 may comprise suitable circuitry, logic, interfaces, and/or code and is configured to perform (at each worker) the gradient aggregation and averaging in connection with gradient synchronization between the workers. In some aspects, the gradient management module 528 receives gradients (e.g., 320, 322, and 324) from the remaining workers, and performs gradient aggregation (e.g., to generate an aggregated gradient) and averaging (e.g., by dividing the aggregated gradient by the total number of workers to obtain an average gradient for updating the model or by using other averaging techniques).

Figure 4:
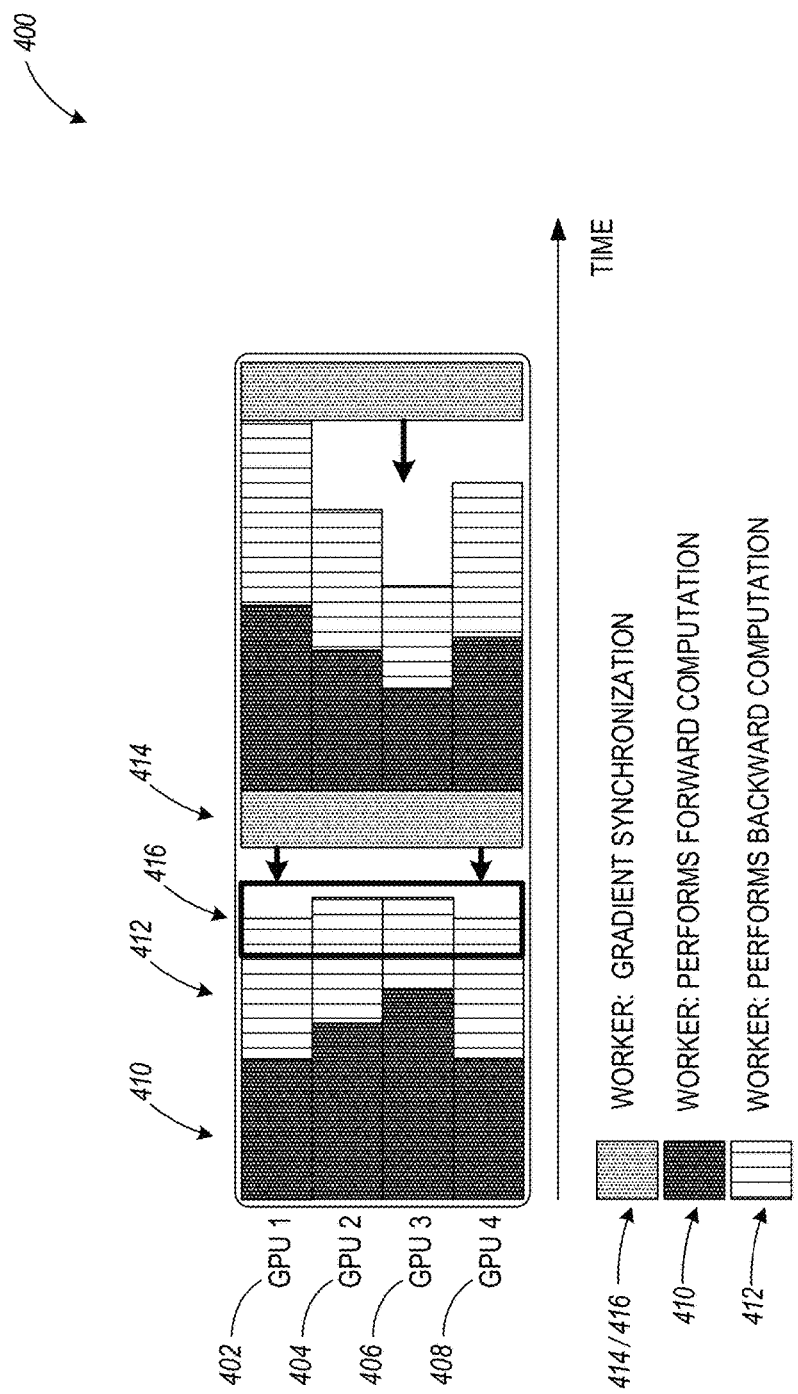
FIG. 4 is a diagram illustrating an example processing flow that can be performed by a worker within the DLTA of FIG. 3 with parallel gradient synchronization and backward computation, according to some example embodiments.

As illustrated in FIG. 3, the DLTA function management module 332, the gradient management module 330, and the neural network model 328 are available globally at each of the workers 302-308. In some aspects, the gradient management module 330 can perform the gradient synchronization in parallel with the backward computation process, as illustrated in FIG. 4. Additionally, the gradient management module 330 can be configured to perform gradient synchronization in parallel while using stale weights for one or more of the layers of the neural network model. The neural network model can be updated using averaged gradients based on the synchronized gradients. In this regard, parallel updating of the neural network model can also be performed, to the extent that the generation of the averaged gradients and the updating of the neural network model with the averaged gradients also takes place in parallel with the backward computation.

FIG. 4 is a diagram 400 illustrating an example processing flow that can be performed by a worker (such as worker 308) within the DLTA of FIG. 3 with parallel gradient synchronization and backward computation, according to some example embodiments. Referring to FIG. 4, each of the illustrated processors (e.g., graphics processing units or GPUs) 402, 404, 406, and 408 are representative of a worker within the DLTA 106. For example, GPUs 402, 404, 406, and 408 can correspond to workers 302, 304, 306, and 308, respectively.

In operation, a worker performs a forward computation 410 followed by a backward computation 412 using its corresponding data portion. At operation 414, after all of the workers have exchanged their gradients with each other, a worker (e.g., worker 308) performs gradient synchronization at operation 414 by averaging all the gradients and updating the gradients in the neural network model that the worker is training. In some aspects and as further explained hereinbelow, the gradient synchronization can be performed in parallel with at least a portion of the backward computation (e.g., gradient synchronization 416 is illustrated in FIG. 3 as being performed in parallel with the backward computation 412). Additionally, since some of the gradients may not be updated when a subsequent iteration starts, the subsequent iteration may use stale weights during the forward computation.

Figure 5:
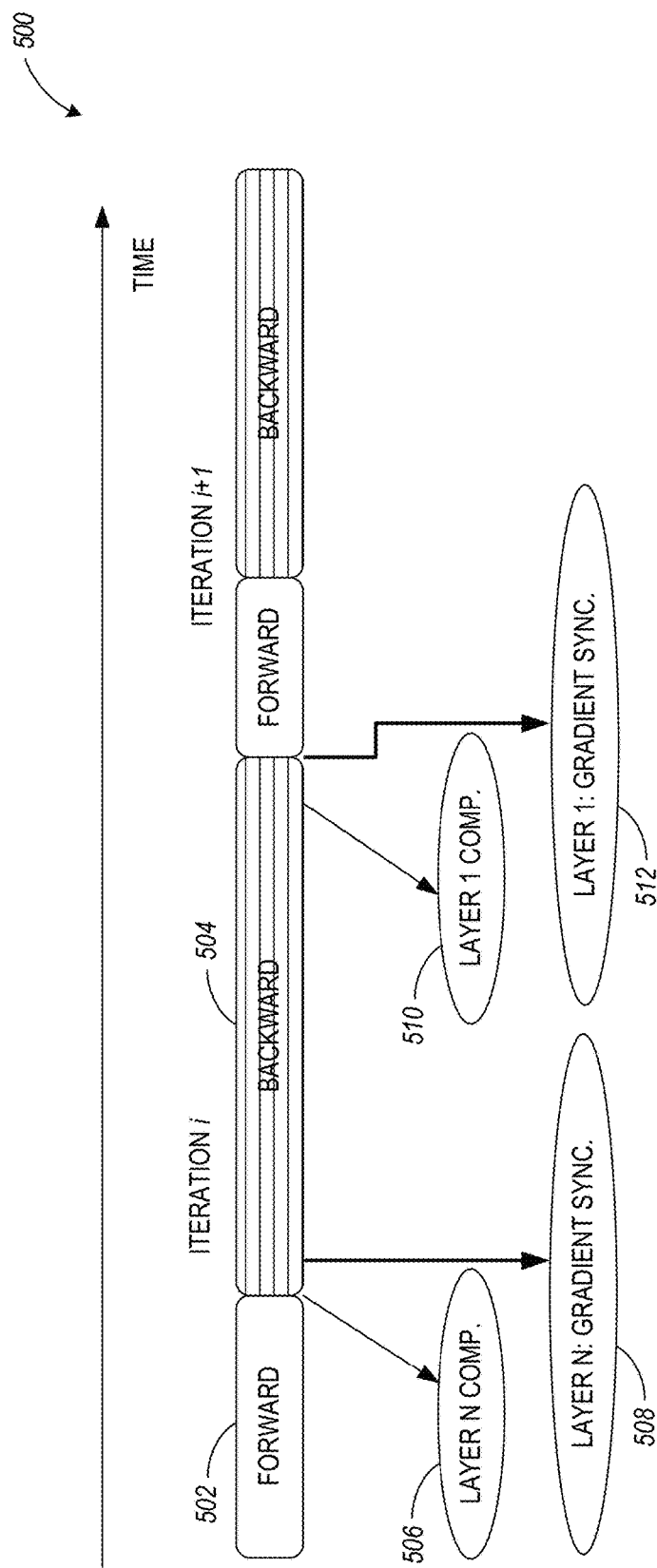
FIG. 5 is a diagram illustrating backward computation being performed in parallel with gradient synchronization, according to some example embodiments.

FIG. 5 is a diagram 500 illustrating backward computation being performed in parallel with gradient synchronization, according to some example embodiments. Referring to FIG. 5, worker 308 can perform iteration i, starting with forward computation 502 and processing Layers 1 to N of the neural network model. The backward computation 504 can follow after the forward computation 502, starting with the layer N computation 506. The gradient synchronization of iteration i starts with Layer N gradient synchronization 508 once the back-propagation computation of gradients of Layer N finishes (as indicated by the bold arrow in FIG. 5). In this regard, Layer N gradient synchronization 508 is performed in parallel with back-propagation (or backward computation) of Layer N−1 through Layer 1.

The start of Layer 1 computation 510 is indicated by an arrow in FIG. 5. When the forward computation of iteration (i+1) starts, the gradient synchronization from iteration i has not finished (e.g., Layer 1 gradient synchronization 512 is indicated as starting at or near the beginning of the forward computation of iteration (i+1)). In this regard, worker 308 can leverage stale weights from the previous iteration (i.e., iteration (i−1)) to accelerate the training process during the iteration (i+1). By using the parallelization of gradient synchronization with back-propagation, training time can be significantly reduced. Additionally, leveraging stale weights for certain layers can further accelerate forward computation and improve training performance Various examples of performing gradient synchronization and using stale weights are illustrated in connection with FIG. 6-FIG. 11.

Figure 6:
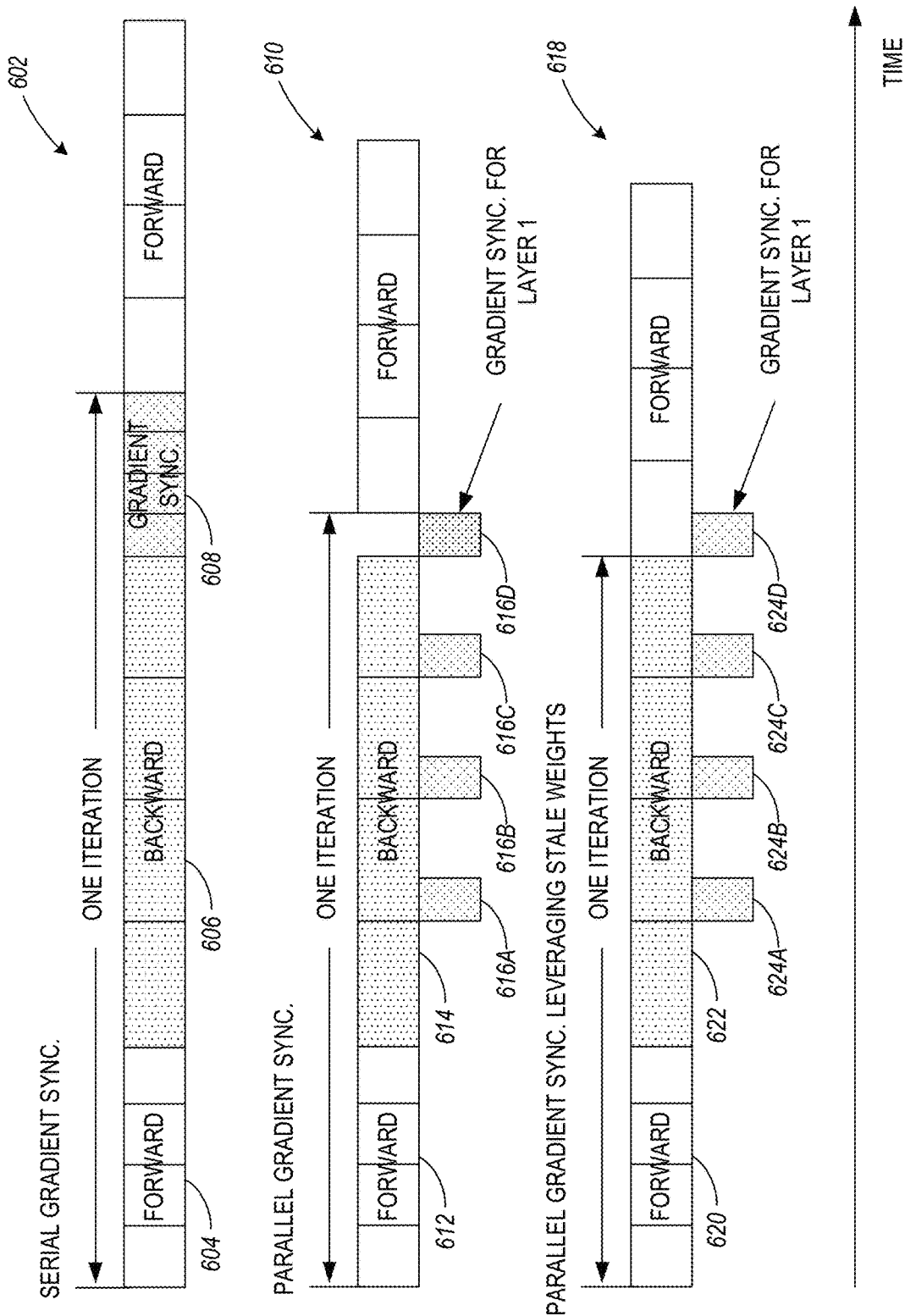
FIG. 6 illustrates various gradient synchronization options in a DLTA with a 4-layer neural network, according to some example embodiments.

FIG. 6 illustrates various gradient synchronization options in a DLTA with a 4-layer neural network, according to some example embodiments. Example gradient synchronization options include serial gradient synchronization 602, parallel gradient synchronization 610 with gradient synchronization for at least some layers being performed in parallel with the backward computation, and parallel gradient synchronization 618 with gradient synchronization for at least one layer using stale weights. As seen in FIG. 6 in connection with the parallel gradient synchronization 610, the forward computation (and the backward computation that follows it, which is not seen in FIG. 6) for a subsequent iteration (i+1) can be performed after the completion of the synchronizing of the gradients in the current iteration (i.e., forward computation for iteration i+1 follows the last gradient synchronization 616D for current iteration i).

Referring to FIG. 6, serial gradient synchronization 602 can include a forward computation 604 followed by a backward computation 606, with gradient synchronization 608 following the backward computation 606.

Figure 7:
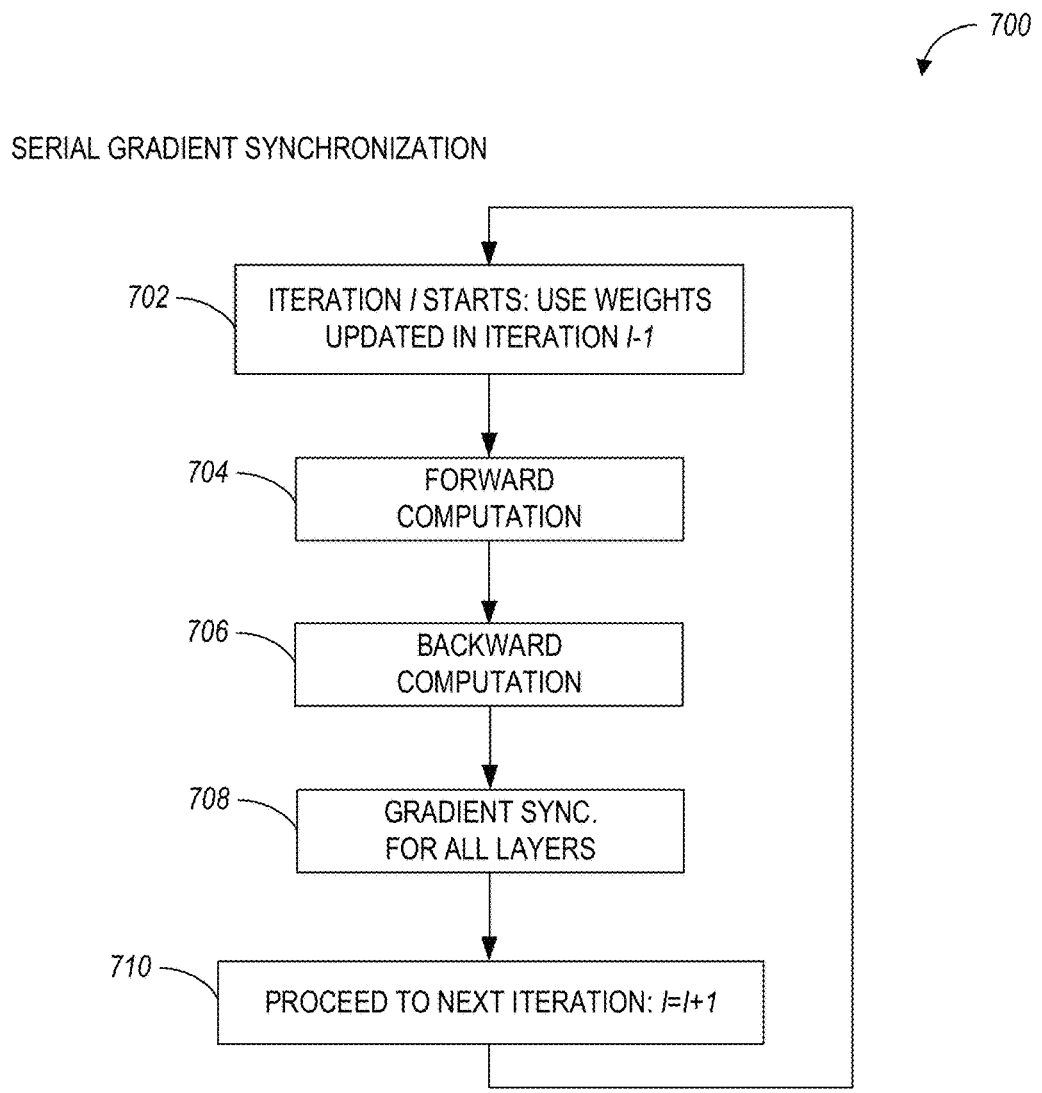
FIG. 7 illustrates a flowchart of a serial gradient synchronization, according to some example embodiments.

FIG. 7 illustrates a flowchart 700 of a serial gradient synchronization, according to some example embodiments. At operation 702, iteration i can start with the worker (e.g., 308) using weights for the neural network model training updated in a previous iteration, such as iteration (i−1). At operation 704, forward computation 604 can be performed. At operation 706, backward computation 606 can be performed. At operation 708, gradient synchronization 608 can be performed for all layers. At operation 710, processing can proceed with the forward computation for the next iteration (i+1).

Referring to FIG. 6, parallel gradient synchronization 610 can include a forward computation 612 followed by a backward computation 614, with gradient synchronization 616A-616D being performed at least partially in parallel with the backward computation 614.

Figure 8:
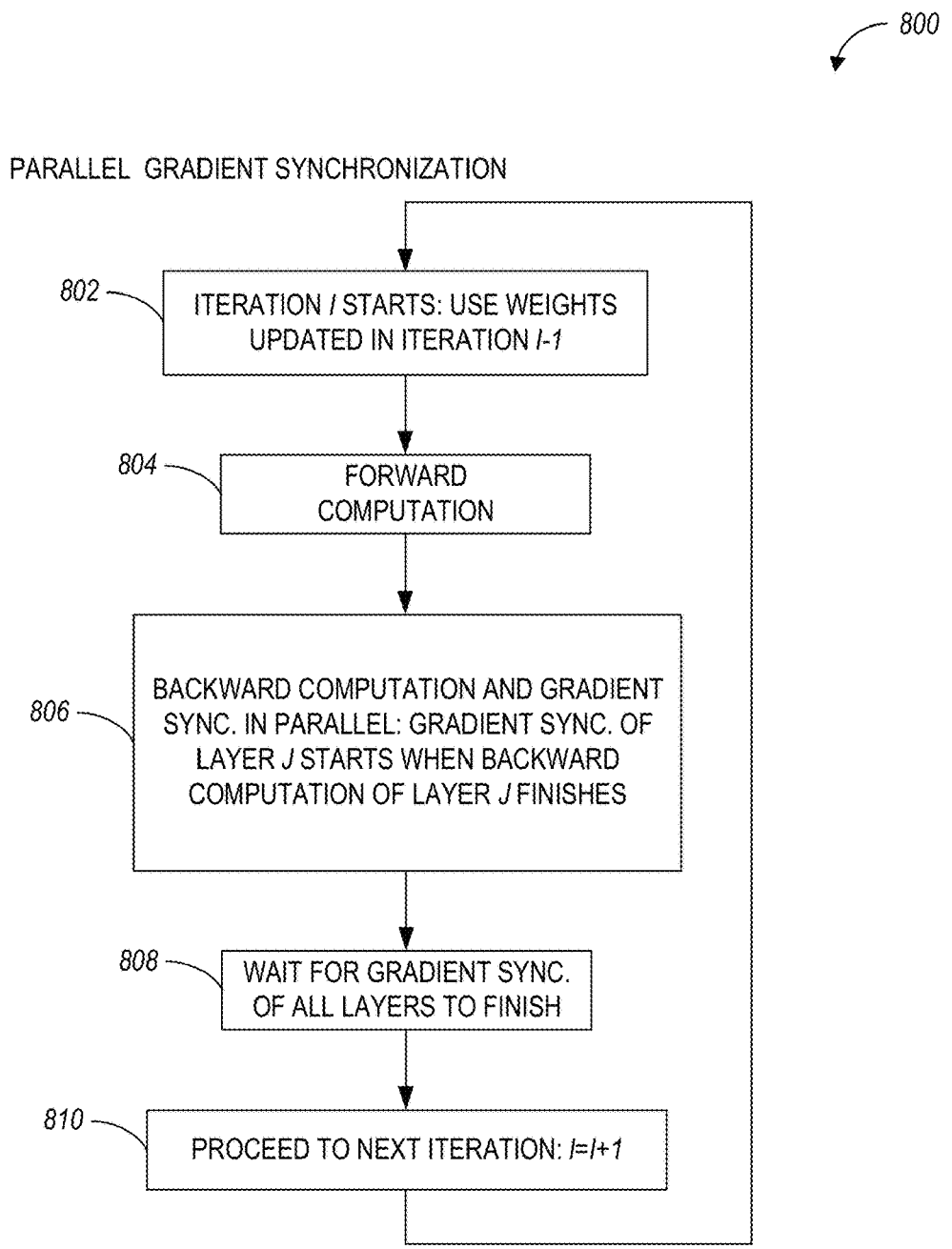
FIG. 8 illustrates a flowchart of a parallel gradient synchronization, according to some example embodiments.

FIG. 8 illustrates a flowchart 800 of a parallel gradient synchronization, according to some example embodiments. At operation 802, iteration i can start with the worker (e.g., worker 308) using weights for the neural network model training updated in a previous iteration, such as iteration (i−1). At operation 804, forward computation 612 can be performed. At operation 806, backward computation 614 and gradient synchronization 616A-616D can be performed in parallel. Since the example network illustrated in FIG. 6 uses a 4-layer neural network model, the gradient synchronization includes four parts 616A, 616B, 616C, and 616D corresponding to gradient synchronization for each of the four layers of the neural network model used by the worker. In this regard, gradient synchronization of layer j (j can be an integer between 1 and 4 in the example illustrated in FIG. 6) starts as soon as backward computation of layer j finishes. At operation 808, the worker can finish gradient synchronization for all layers before proceeding to the next iteration. More specifically, and as seen in FIG. 6, gradient synchronization 616D is performed after (or after completion of) the backward computation 614 has finished and before forward computation for the next iteration has started. At operation 810, processing can proceed with the forward computation for the next iteration (i+1).

Referring to FIG. 6, parallel gradient synchronization 618 with layer 1 using stale weights can include a forward computation 620 followed by a backward computation 622, with gradient synchronization 624A-624C being performed in parallel with the backward computation 622.

Figure 9:
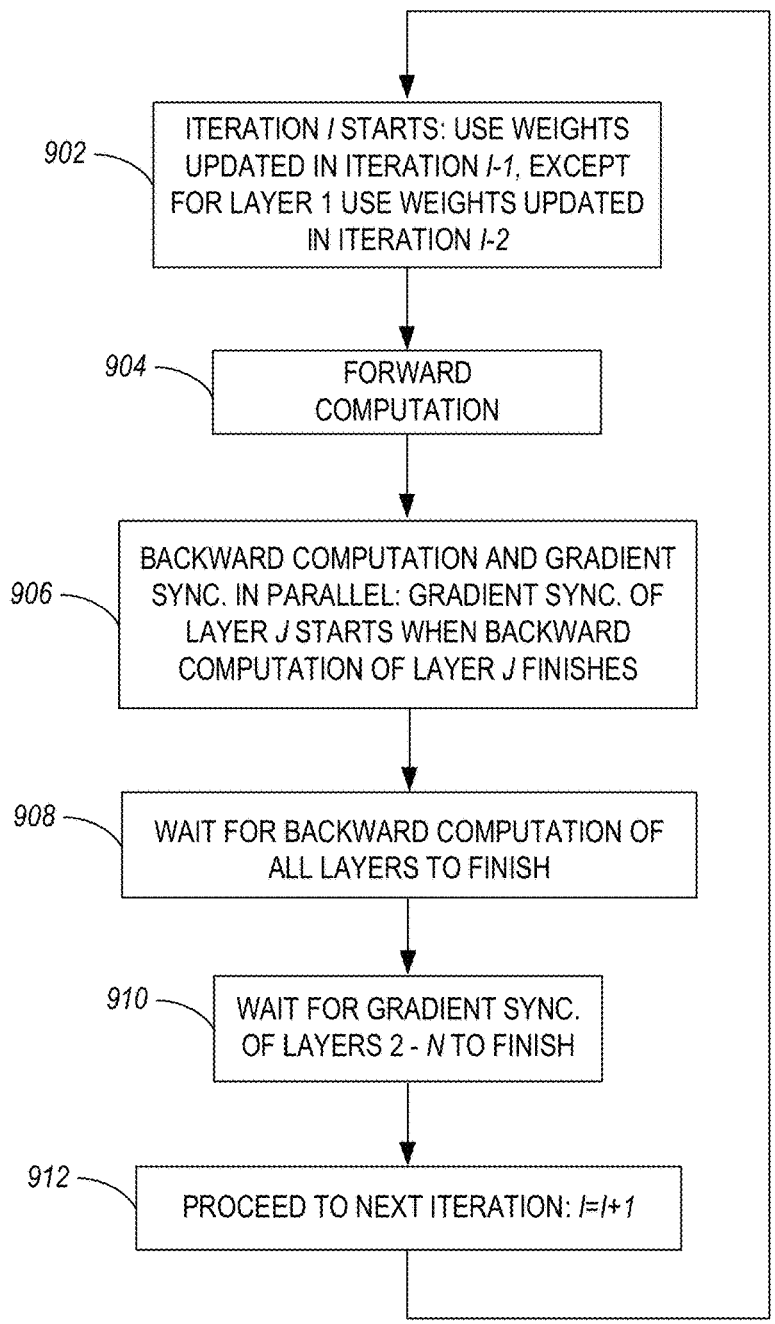
FIG. 9 illustrates a flowchart of a parallel gradient synchronization with layer 1 using stale weights, according to some example embodiments.

FIG. 9 illustrates a flowchart 900 of a parallel gradient synchronization with layer 1 using stale weights, according to some example embodiments. At operation 902, iteration i can start with the worker (e.g., worker 308) using weights for the neural network model training updated in a previous iteration, such as iteration (i−1), except for layer 1, where weights updated in iteration (i−2) are used. At operation 904, forward computation 620 can be performed. At operation 906, backward computation 622 and gradient synchronization 624A-624C can be performed in parallel. Since the example network illustrated in FIG. 6 uses a 4-layer neural network model, the gradient synchronization includes four gradient synchronization parts 624A, 624B, 624C, and 624D corresponding to gradient synchronization for each of the four layers of the neural network model used by the worker. In this regard, gradient synchronization of layer j (j can be an integer between 2 and 4 in the example illustrated in FIG. 6) starts as soon as backward computation of layer j finishes. At operation 908, the worker can finish backward computation 622. At operation 910, the worker can wait until gradient synchronization for all layers N through 2 have finished (e.g., gradient synchronization parts 624A, 624B, and 624C) before proceeding to the next iteration. As seen in FIG. 6, gradient synchronization 624D can be performed during the forward computation of the next iteration (i+1). At operation 912, processing can proceed with the forward computation for the next iteration (i+1).

Figure 10:
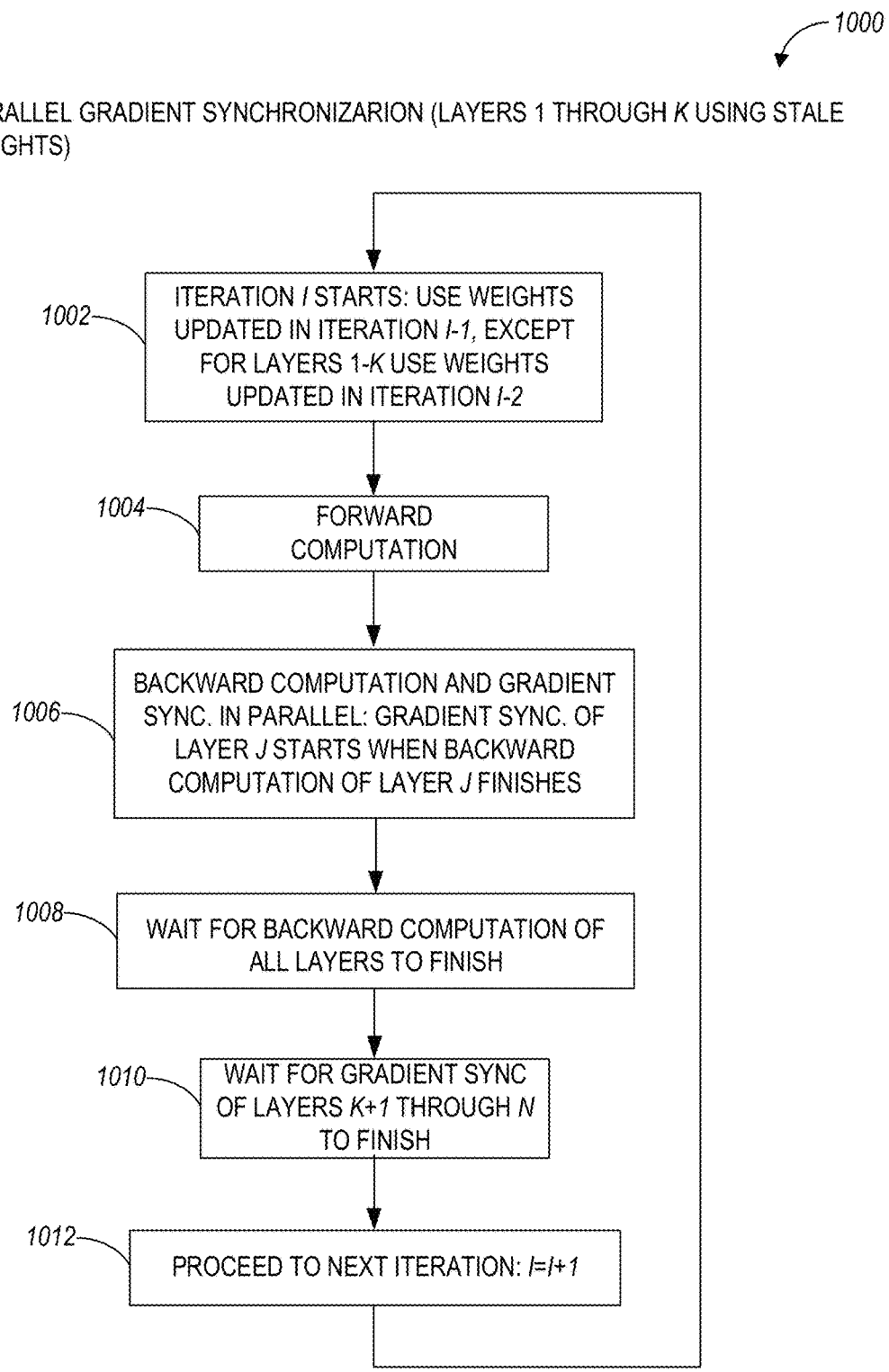
FIG. 10 illustrates a flowchart of a parallel gradient synchronization with layers 1 through K using stale weights, according to some example embodiments.

FIG. 10 illustrates a flowchart 1000 of a parallel gradient synchronization with layers 1 through K using stale weights, according to some example embodiments. At operation 1002, iteration i can start with the worker (e.g., 308) using weights for the neural network model training updated in a previous iteration, such as iteration (i−1), except for layers 1 through k where weights updated in iteration (i−2) are used (i.e., stale weights). At operation 1004, forward computation 620 can be performed. At operation 1006, backward computation 622 and gradient synchronization can be performed in parallel, where gradient synchronization of layer j (j can be an integer between N and k+1) starts as soon as backward computation of layer j finishes. At operation 1008, the worker can finish backward computation 622. At operation 1010, the worker can wait until gradient synchronization for all layers N through (k+1) has finished before proceeding to the next iteration. At operation 1012, processing can proceed with the forward computation for the next iteration (i+1).

Figure 11:
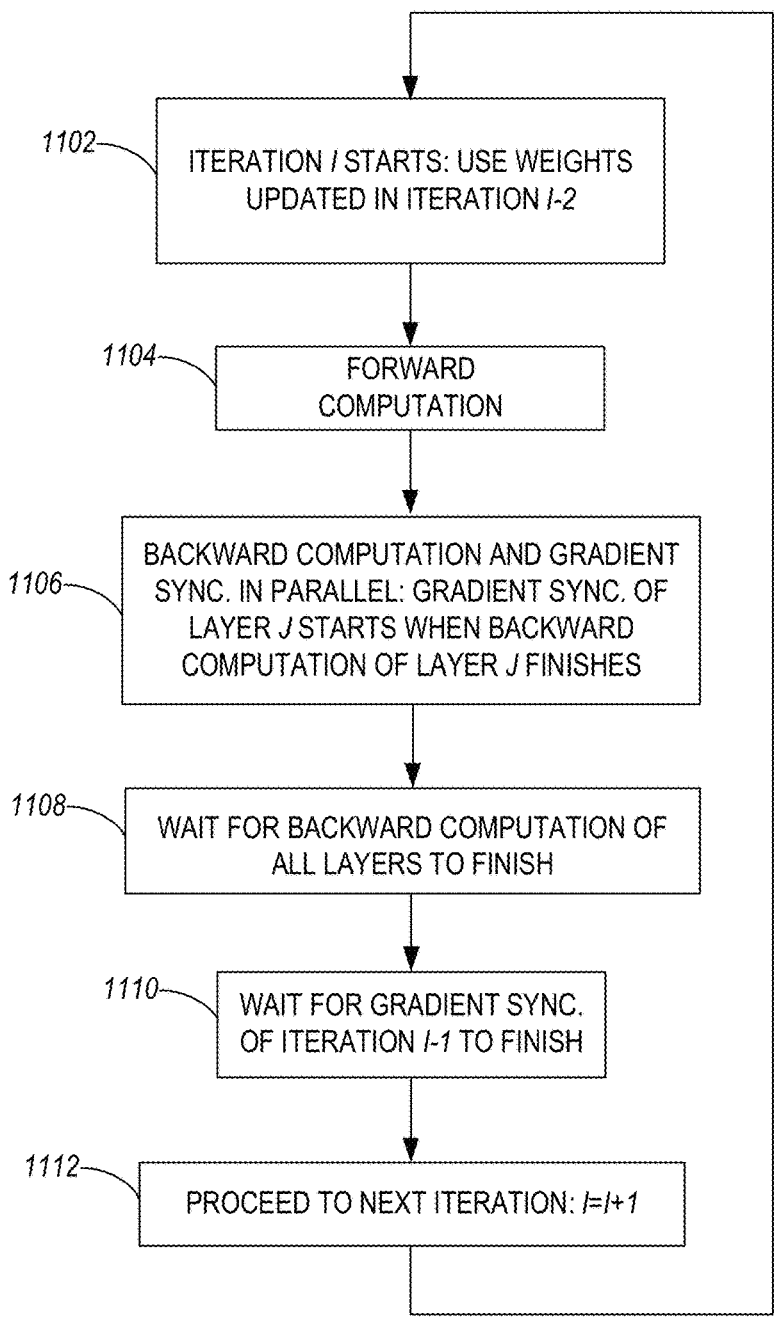
FIG. 11 illustrates a flowchart of a parallel gradient synchronization with all layers using stale weights, according to some example embodiments.

FIG. 11 illustrates a flowchart 1100 of a parallel gradient synchronization with all layers using stale weights, according to some example embodiments. At operation 1102, iteration i can start with the worker (e.g., 308) using weights for the neural network model training updated in a previous iteration, such as iteration (i−2) (i.e., stale weights are used for all layers). At operation 1104, forward computation 620 can be performed. At operation 1106, backward computation 622 and gradient synchronization can be performed in parallel, where gradient synchronization of layer j (j can be an integer between 1 and N) starts as soon as backward computation of layer j finishes. At operation 1108, the worker can finish backward computation 622 for all layers. At operation 1110, the worker can wait until gradient synchronization for all layers has finished for iteration (i−1) before proceeding to the next iteration. At operation 1112, processing can proceed with the forward computation for the next iteration (i+1).

Figure 12:
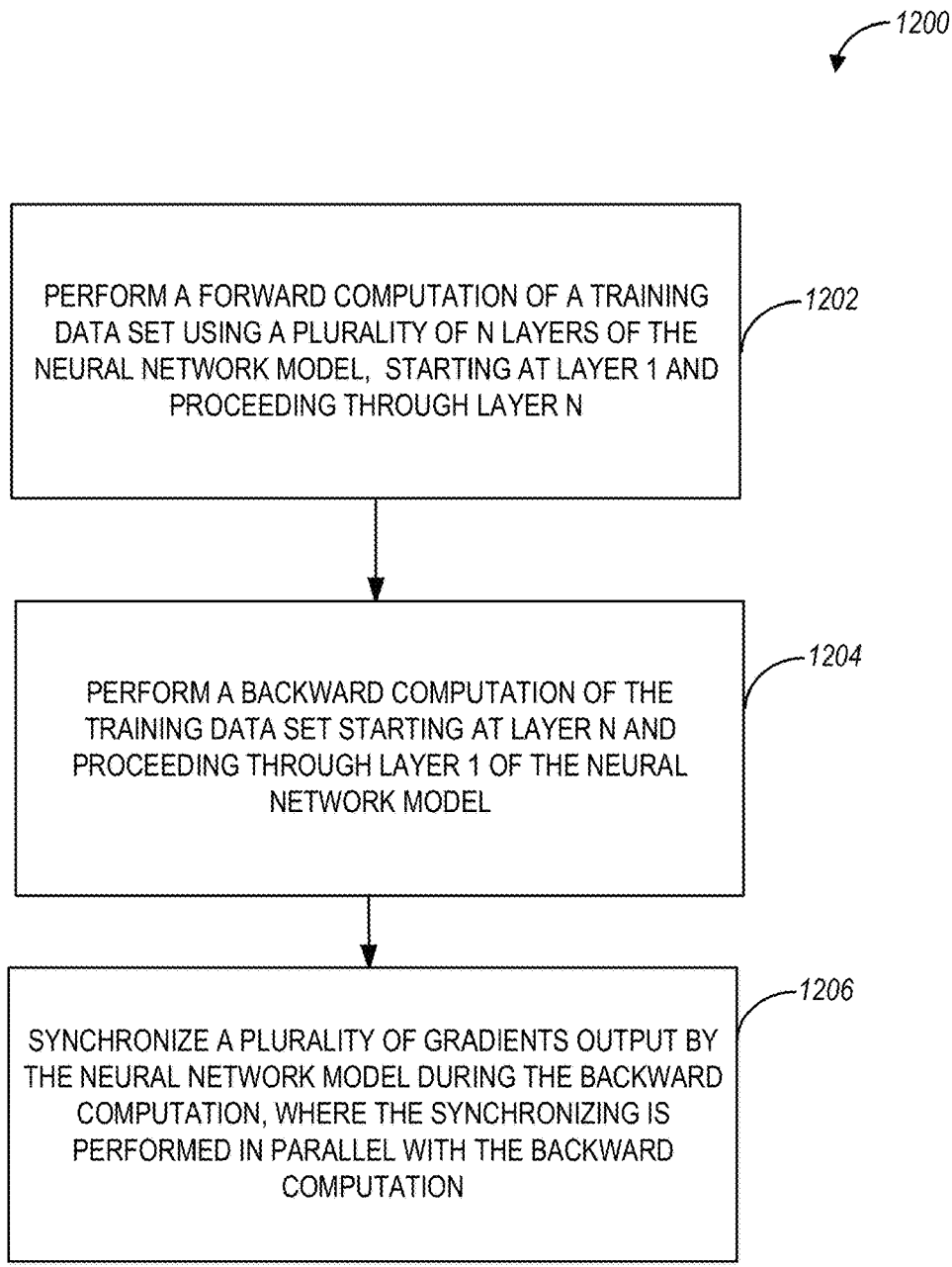
FIG. 12 is a flowchart of a method suitable for distributed synchronous training of a neural network model within a DLTA, according to some example embodiments.

FIG. 12 is a flowchart of a method for distributed synchronous training of a neural network model within a DLTA, according to some example embodiments. Method 1200 includes operations 1202, 1204, and 1206. By way of example and not limitation, method 1200 is described as being performed by the worker machine (e.g., 308) or other modules within the DLTA 106. The worker machine (e.g., 308) can be the same as device 1400 illustrated in FIG. 14.

At operation 1202, worker 308 can perform a forward computation (e.g., 620 in FIG. 6) of a training data set using a plurality of N layers of the neural network model, the forward computation starting at Layer 1 and proceeding through Layer N. At operation 1204, worker 308 can perform a backward computation (e.g., 622 in FIG. 6) of the training data set, the backward computation starting at Layer N and proceeding through Layer 1 of the neural network model. At operation 1206, worker 308 can synchronize a plurality of gradients generated by the neural network model during the backward computation. Forward computations use parameters/weights that are updated using the synchronized gradients. The synchronizing of the plurality of gradients is performed with other worker machines of the plurality of worker machines and in parallel with the backward computation. For example, and as illustrated in FIG. 6, worker 308 can perform backward computation 622 and gradient synchronization 624A-624C in parallel.

Figure 13:
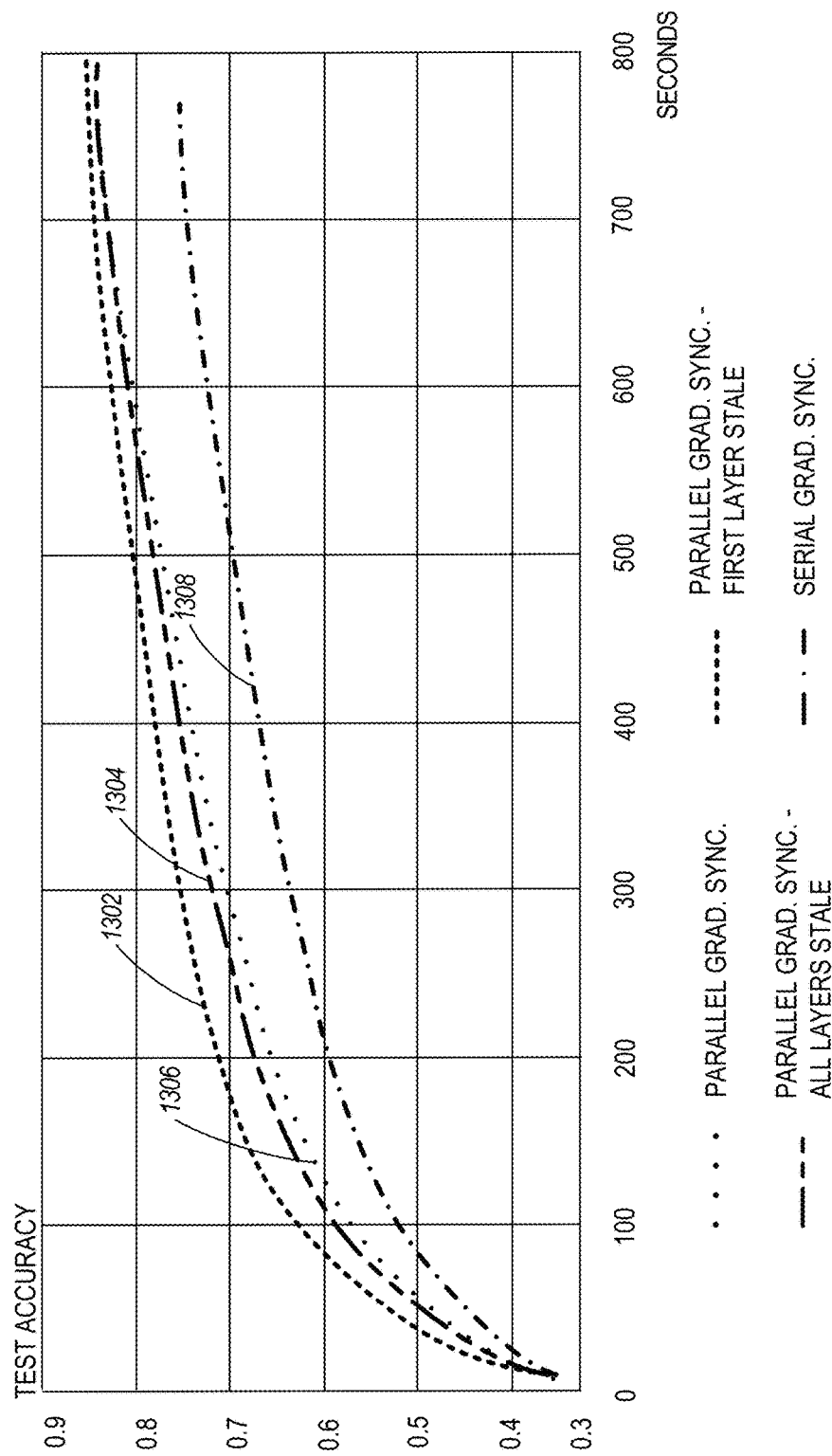
FIG. 13 and FIG. 14 illustrate various performance evaluation graphs associated with gradient synchronization using disclosed techniques, according to some example embodiments.
Figure 14:
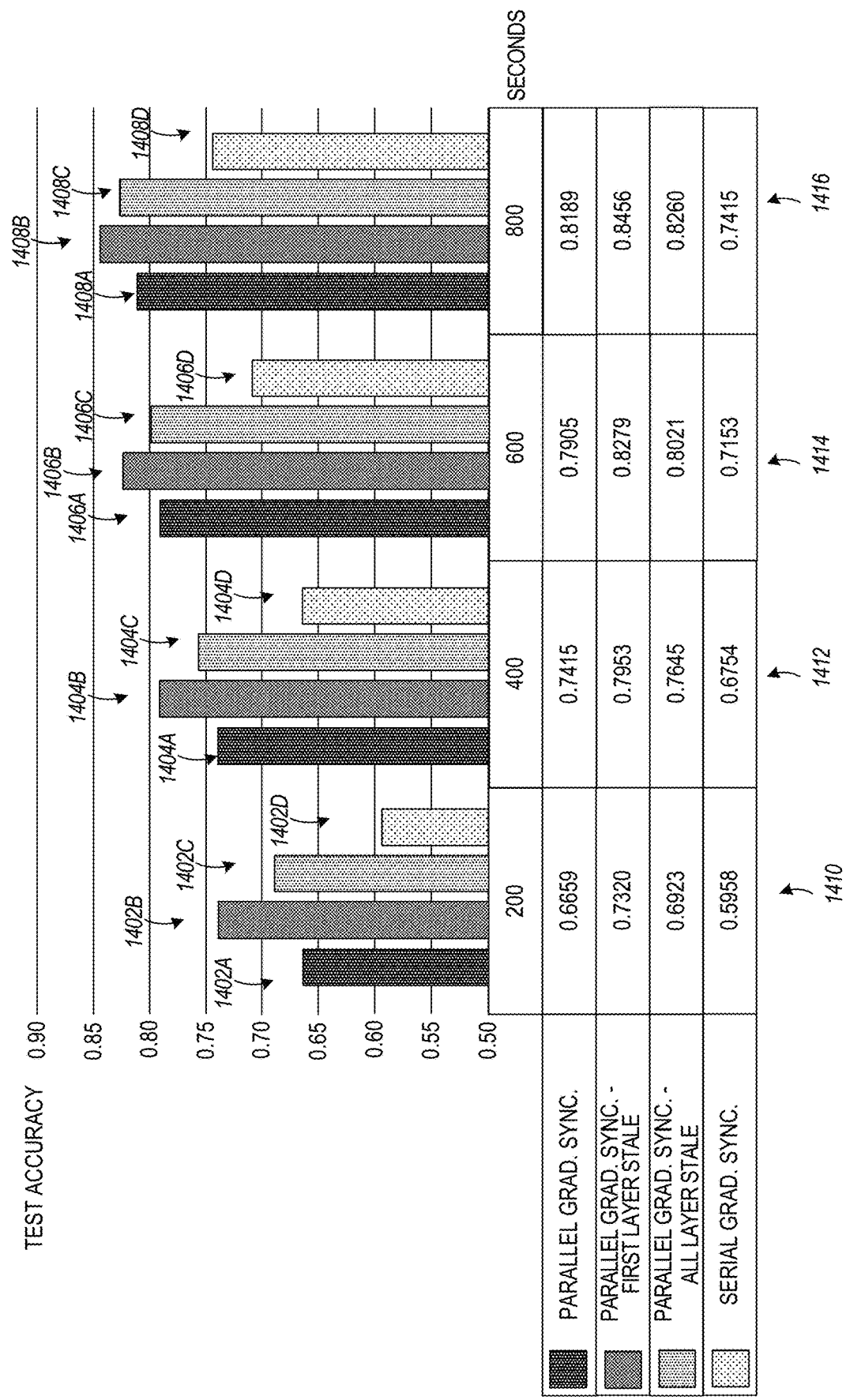

FIG. 13 and FIG. 14 illustrate various performance evaluation graphs associated with gradient synchronization using disclosed techniques, according to some example embodiments. Referring to FIG. 13, graphs 1302, 1304, 1306, and 1308 represent test accuracy associated with parallel gradient synchronization (first layer using stale weights) at graph 1302, parallel gradient synchronization (all layers using stale weights) at graph 1304, parallel gradient synchronization at graph 1306, and serial gradient synchronization at graph 1308, respectively. As noted from the graphs, parallel gradient synchronization is significantly faster than serial gradient synchronization. Leveraging stale weights helps the training process converge faster than the regular parallel approach. When leveraging stale weights for the first layer, the training process has the most optimal (accurate) performance.

Referring to FIG. 14, graphs 1402A-1402D, 1404A-1404D, 1406A-1406D, and 1408A-1408D represent test accuracy associated with parallel gradient synchronization (first layer using stale weights) (graphs 1402B, 1404B, 1406B, 1408B), parallel gradient synchronization (all layers using stale weights) (graphs 1402C, 1404C, 1406C, 1408C), parallel gradient synchronization (graphs 1402A, 1404A, 1406A, 1408A), and serial gradient synchronization (graphs 1402D, 1404D, 1406D, 1408D) at different time instances (e.g., time instance 1410 at 200 seconds, time instance 1412 at 400 seconds, time instance 1414 at 600 seconds, and time instance 1416 at 800 seconds). As noted from the graphs, at time instance 1410 (at 200 seconds), the first-layer stale approach (for graph 1402B) has a test accuracy of approximately 0.74, which is approximately 9.9%, 5.7%, and 22.9% higher than the regular parallel gradient synchronization (graph 1402A), the all-layer stale gradient synchronization (graph 1402C), and the serial gradient synchronization (graph 1402D) respectively. At time instance 1416 (at 800 seconds), the first-layer stale approach (for graph 1408B) has a test accuracy of approximately 0.84, which is approximately 3.3%, 2.4%, and 14.0% higher than the regular parallel gradient synchronization (graph 1408A), the all-layer stale gradient synchronization (graph 1408C), and the serial gradient synchronization (graph 1408D) respectively.

In some aspects, techniques disclosed herein can be used for gradient synchronization that takes place faster than conventional (e.g., serial) gradient synchronization techniques. In this regard, techniques disclosed herein can be used for time-efficient training of machine learning models in time-sensitive applications, such as self-driving applications or other types of applications that use machine learning models and need to train or re-train the models in a time-sensitive manner.

Figure 15:
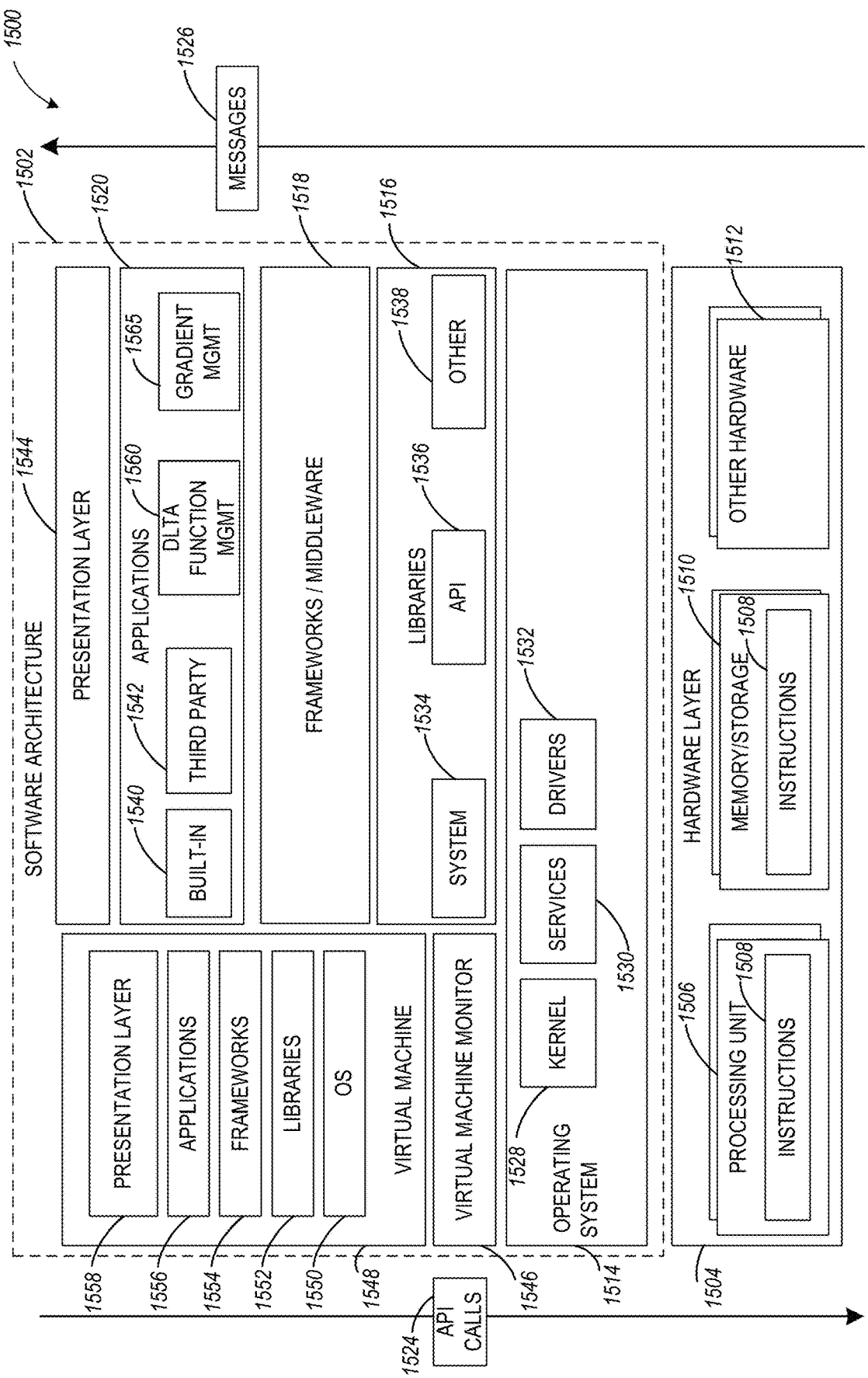
FIG. 15 is a block diagram illustrating a representative software architecture, which may be used in conjunction with various device hardware described herein, according to some example embodiments.

FIG. 15 is a block diagram illustrating a representative software architecture 1500, which may be used in conjunction with various device hardware described herein, according to some example embodiments. FIG. 15 is merely a non-limiting example of a software architecture 1502 and it will be appreciated that many other architectures may be implemented to facilitate the functionality described herein. The software architecture 1502 may be executing on hardware such as device 1600 of FIG. 16 that includes, among other things, processor 1605, memory 1610, storage 1615 and 1620, and I/O components 1625 and 1630.

Figure 16:
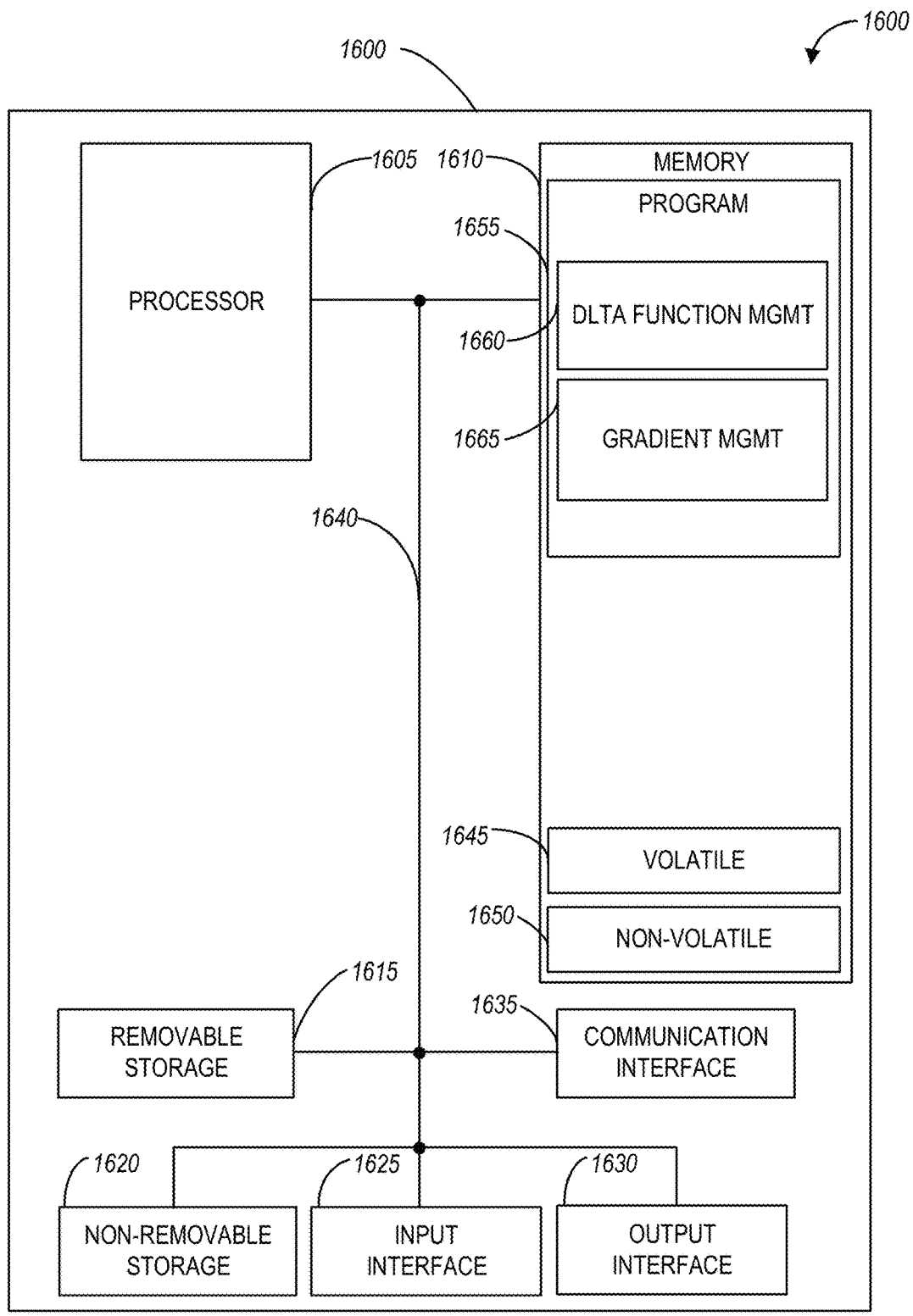
FIG. 16 is a block diagram illustrating circuitry for a device that implements algorithms and performs methods, according to some example embodiments.

A representative hardware layer 1504 is illustrated and can represent, for example, the device 1600 of FIG. 16. The representative hardware layer 1504 comprises one or more processing units 1506 having associated executable instructions 1508. Executable instructions 1508 represent the executable instructions of the software architecture 1502, including implementation of the methods, modules, and so forth of FIGS. 1-14. Hardware layer 1504 also includes memory and/or storage modules 1510, which also have executable instructions 1508. Hardware layer 1504 may also comprise other hardware 1512, which represents any other hardware of the hardware layer 1504, such as the other hardware illustrated as part of device 1600.

In the example architecture of FIG. 15, the software architecture 1502 may be conceptualized as a stack of layers where each layer provides particular functionality. For example, the software architecture 1502 may include layers such as an operating system 1514, libraries 1516, frameworks/middleware 1518, applications 1520, and presentation layer 1544. Operationally, the applications 1520 and/or other components within the layers may invoke application programming interface (API) calls 1524 through the software stack and receive a response, returned values, and so forth illustrated as messages 1526 in response to the API calls 1524. The layers illustrated in FIG. 15 are representative in nature and not all software architectures 1502 have all layers. For example, some mobile or special purpose operating systems may not provide frameworks/middleware 1518, while others may provide such a layer. Other software architectures may include additional or different layers.

The operating system 1514 may manage hardware resources and provide common services. The operating system 1514 may include, for example, a kernel 1528, services 1530, and drivers 1532. The kernel 1528 may act as an abstraction layer between the hardware and the other software layers. For example, kernel 1528 may be responsible for memory management, processor management (e.g., scheduling), component management, networking, security settings, and so on. Services 1530 may provide other common services for the other software layers. The drivers 1532 may be responsible for controlling or interfacing with the underlying hardware. For instance, the drivers 1532 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 1516 may provide a common infrastructure that may be utilized by the applications 1520 and/or other components and/or layers. The libraries 1516 typically provide functionality that allows other software modules to perform tasks more easily than to interface directly with the underlying operating system 1514 functionality (e.g., kernel 1528, services 1530, and/or drivers 1532). The libraries 1516 may include system libraries 1534 (e.g., C standard library) that may provide functions such as memory allocation functions, string manipulation functions, mathematic functions, and the like. In addition, the libraries 1516 may include API libraries 1536 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1516 may also include a wide variety of other libraries 1538 to provide many other APIs to the applications 1520 and other software components/modules.

The frameworks/middleware 1518 (also sometimes referred to as middleware) may provide a higher-level common infrastructure that may be utilized by the applications 1520 and/or other software components/modules. For example, the frameworks/middleware 1518 may provide various graphical user interface (GUI) functions, high-level resource management, high-level location services, and so forth. The frameworks/middleware 1518 may provide a broad spectrum of other APIs that may be utilized by the applications 1520 and/or other software components/modules, some of which may be specific to a particular operating system 1514 or platform.

The applications 1520 include built-in applications 1540, third-party applications 1342, a DLTA function management module 1560, and a gradient management module 1565. In some aspects, the DLTA function management module 1560 and the gradient management module 1565 may comprise suitable circuitry, logic, interfaces, and/or code and can be configured to perform one or more of the functions discussed in connection with modules 332 and 330 of FIG. 3.

Examples of representative built-in applications 1540 may include but are not limited to, a contacts application, a browser application, a book reader application, a location application, a media application, a messaging application, and/or a game application. Third-party applications 1542 may include any of the built-in applications 1540 as well as a broad assortment of other applications. In a specific example, the third-party application 1542 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1542 may invoke the API calls 1524 provided by the mobile operating system such as operating system 1514 to facilitate the functionality described herein.

The applications 1520 may utilize built-in operating system functions (e.g., kernel 1528, services 1530, and drivers 1532), libraries (e.g., system libraries 1534, API libraries 1536, and other libraries 1538), and frameworks/middleware 1518 to create user interfaces to interact with users of the system. Alternatively, or additionally, in some systems, interactions with a user may occur through a presentation layer, such as presentation layer 1544. In these systems, the application/module "logic" can be separated from the aspects of the application/module that interact with a user.

Some software architectures utilize virtual machines. In the example of FIG. 15, this is illustrated by virtual machine 1548. A virtual machine creates a software environment where applications/modules can execute as if they were executing on a hardware machine (such as the device 1600 of FIG. 16, for example). A virtual machine 1548 is hosted by a host operating system (e.g., operating system 1514) and typically, although not always, has a virtual machine monitor 1546, which manages the operation of the virtual machine 1548 as well as the interface with the host operating system (i.e., operating system 1514). A software architecture 1502 executes within the virtual machine 1548 such as an operating system 1550, libraries 1552, frameworks/middleware 1554, applications 1556, and/or presentation layer 1558. These layers of software architecture executing within the virtual machine 1548 can be the same as corresponding layers previously described or may be different.

FIG. 16 is a block diagram illustrating circuitry for a device that implements algorithms and performs methods, according to some example embodiments. All components need not be used in various embodiments. For example, clients, servers, and cloud-based network devices may each use a different set of components, or in the case of servers, larger storage devices.

One example computing device in the form of a computer 1600 (also referred to as computing device 1600, computer system 1600, or computer 1600) may include a processor 1605, memory 1610, removable storage 1615, non-removable storage 1620, input interface 1625, output interface 1630, and communication interface 1635, all connected by a bus 1640. Although the example computing device is illustrated and described as the computer 1600, the computing device may be in different forms in different embodiments.

The memory 1610 may include volatile memory 1645 and/or non-volatile memory 1650 and may store a program 1655. The computing device 1600 may include—or have access to a computing environment that includes—a variety of computer-readable media, such as the volatile memory 1645, the non-volatile memory 1650, the removable storage 1615, and/or the non-removable storage 1620. Computer storage includes random-access memory (RAM), read-only memory (ROM), erasable programmable read-only memory (EPROM), electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

Computer-readable instructions stored on a computer-readable medium (e.g., the program 1655 stored in the memory 1610) are executable by the processor 1605 of the computing device 1600. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example. As used herein, the terms "computer-readable medium" and "machine-readable medium" are interchangeable.

Program 1655 may utilize a customer preference structure using modules discussed herein, such as the DLTA function management module 1660 and the gradient management module 1665, which may be the same as modules 332 and 330 discussed in connection with FIG. 3.

Any one or more of the modules described herein may be implemented using hardware (e.g., a processor of a machine, an application-specific integrated circuit (ASIC), field-programmable gate array (FPGA), or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

In some aspects, modules 1660 and 1665, as well as one or more other modules that are part of the program 1655, can be integrated as a single module, performing the corresponding functions of the integrated modules.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

It should be further understood that software including one or more computer-executable instructions that facilitate processing and operations as described above with reference to any one or all of the steps of the disclosure can be installed in and sold with one or more computing devices consistent with the disclosure. Alternatively, the software can be obtained and loaded into one or more computing devices, including obtaining the software through a physical medium or distribution system, including, for example, from a server owned by the software creator or from a server not owned but used by the software creator. The software can be stored on a server for distribution over the Internet, for example.

Also, it will be understood by one skilled in the art that this disclosure is not limited in its application to the details of construction and the arrangement of components outlined in the description or illustrated in the drawings. The embodiments herein are capable of other embodiments and capable of being practiced or carried out in various ways. Also, it will be understood that the phraseology and terminology used herein is for description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled," and variations thereof, are not restricted to physical or mechanical connections or couplings. Further, terms such as up, down, bottom, and top are relative, and are employed to aid illustration, but are not limiting.

The components of the illustrative devices, systems, and methods employed in accordance with the illustrated embodiments can be implemented, at least in part, in digital electronic circuitry, analog electronic circuitry, or computer hardware, firmware, software, or in combinations of them. These components can be implemented, for example, as a computer program product such as a computer program, program code or computer instructions tangibly embodied in an information carrier, or a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, or other units suitable for use in a computing environment. A computer program can be deployed to be executed on one computer or multiple computers at one site or distributed across multiple sites and interconnected by a communication network. Also, functional programs, codes, and code segments for accomplishing the techniques described herein can be easily construed as within the scope of the claims by programmers skilled in the art to which the techniques described herein pertain. Method steps associated with the illustrative embodiments can be performed by one or more programmable processors executing a computer program, code, or instructions to perform functions (e.g., by operating on input data and/or generating an output). Method steps can also be performed by, and apparatus for performing the methods can be implemented as, special purpose logic circuitry, e.g., an FPGA (field-programmable gate array) or an ASIC (application-specific integrated circuit), for example.

The various illustrative logical blocks, modules, and circuits described in connection with the embodiments disclosed herein may be implemented or performed with a general-purpose processor, a digital signal processor (DSP), an ASIC, an FPGA or other programmable logic device, discrete gate, or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random-access memory or both. The required elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, or data storage disks (e.g., magnetic disks, internal hard disks, or removable disks, magneto-optical disks, or CD-ROM and DVD-ROM disks). The processor and the memory can be supplemented by or incorporated in special purpose logic circuitry.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

As used herein, "machine-readable medium" (or "computer-readable medium") comprises a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store processor instructions. The term "machine-readable medium" shall also be taken to include any medium or a combination of multiple media, that is capable of storing instructions for execution by one or more processors 1605, such that the instructions, when executed by one or more processors 1605, cause the one or more processors 1605 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" as used herein excludes signals per se.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the scope disclosed herein.

Although the present disclosure has been described with reference to specific features and embodiments thereof, it is evident that various modifications and combinations can be made thereto without departing from the scope of the disclosure. For example, other components may be added to, or removed from, the described systems. The specification and drawings are, accordingly, to be regarded simply as an illustration of the disclosure as defined by the appended claims, and are contemplated to cover any modifications, variations, combinations, or equivalents that fall within the scope of the present disclosure. Other aspects may be within the scope of the following claims.

What is claimed is:

1. A computer-implemented method for distributed synchronous training of a neural network model, the method comprising:
    decoding a configuration instruction received by a worker machine of a plurality of worker machines coupled in a ring topology of a deep-learning training architecture (DLTA), the configuration instruction received from a DLTA function management circuit of the DLTA, and the configuration instruction communicated to the plurality of worker machines to indicate the neural network model for the distributed synchronous training;
    performing, by the worker machine of the plurality of worker machines, a forward computation of a training data set using a plurality of N layers of the neural network model, the forward computation starting at Layer 1 and proceeding through Layer N of the neural network model, at least one layer of the plurality of N layers of the neural network model configured with weights updated from gradients synchronized in a previous iteration;
    performing, by the worker machine, a backward computation of the training data set, the backward computation starting at Layer N and proceeding through Layer 1 of the neural network model; and
    synchronizing, by the worker machine, a plurality of gradients outputted by the neural network model during the backward computation based on a synchronization instruction received from a gradient management circuit of the DLTA, the synchronizing of the plurality of gradients performed with other worker machines of the plurality of worker machines and in parallel with the backward computation, and the synchronization instruction causing initiation of the synchronizing based on synchronization of Layer N gradients once the backward computation of the layer N has completed.

2. The computer-implemented method of claim 1, further comprising:
    performing the forward computation and the backward computation for a current iteration i of the training data set, wherein a first portion of the plurality of gradients are synchronized in iteration (i−1), and a second remaining portion of the plurality of gradients are synchronized in iteration (i−2).

3. The computer-implemented method of claim 1, further comprising:
    performing the forward computation and the backward computation for a current iteration i of the training data set, wherein Layers 2 through N use weights updated from the plurality of gradients as synchronized in iteration (i−1), and Layer 1 uses weights updated from the plurality of gradients as synchronized in iteration (i−2).

4. The computer-implemented method of claim 1, further comprising:
    performing the forward computation and the backward computation for a current iteration i of the training data set, the plurality of gradients used for updating weights for the forward computation and the backward computation are synchronized in iteration (i−2).

5. The computer-implemented method of claim 1, further comprising:
    performing the forward computation and the backward computation for a current iteration i of the training data set, the plurality of gradients used for updating weights for the forward computation and the backward computation are synchronized in iteration (i−1).

6. The computer-implemented method of claim 5, further comprising:
    performing the forward computation and the backward computation for a subsequent iteration (i+1) of the training data set, subsequent to completion of the synchronizing of the plurality of gradients.

7. The computer-implemented method of claim 1, wherein the synchronizing of the plurality of gradients further comprises:
    performing gradient aggregation using the plurality of gradients to generate aggregated gradients;
    updating the neural network model using the aggregated gradients;
    averaging the aggregated gradients to generate averaged gradients; and
    updating a plurality of weights of the neural network model using the averaged gradients.

8. A distributed synchronous training system for training a neural network model, the system comprising:
- a plurality of worker machines coupled in a ring topology of a deep-learning training architecture (DLTA), each worker machine of the plurality of worker machines comprising:
- a memory that stores instructions; and
- one or more processors in communication with the memory, wherein the one or more processors execute the instructions to:
  - decode, by the worker machine of the plurality of worker machines, a configuration instruction received from a DLTA function management circuit of the DLTA, and the configuration instruction communicated to the plurality of worker machines to indicate the neural network model for distributed synchronous training;
  - perform, by the worker machine of the plurality of worker machines, a forward computation of a training data set using a plurality of N layers of the neural network model, the forward computation starting at Layer 1 and proceeding through Layer N of the neural network model, at least one layer of the plurality of N layers of the neural network model configured with weights updated from gradients synchronized in a previous iteration;
  - perform a backward computation of the training data set, the backward computation starting at Layer N and proceeding through Layer 1 of the neural network model; and
  - synchronize a plurality of gradients outputted by the neural network model during the backward computation based on a synchronization instruction received from a gradient management circuit of the DLTA, the synchronizing of the plurality of gradients performed with other worker machines of the plurality of worker machines and in parallel with the backward computation, and the synchronization instruction causing initiation of the synchronizing based on synchronization of Layer N gradients once the backward computation of the Layer N has completed.

9. The system of claim 8, wherein the one or more processors are further configured to:
- perform the forward computation and the backward computation for a current iteration i of the training data set, wherein a first portion of the plurality of gradients are synchronized in iteration (i−1), and a second remaining portion of the plurality of gradients are synchronized in iteration (1-2).

10. The system of claim 8, wherein the one or more processors are further configured to:
- perform the forward computation and the backward computation for a current iteration i of the training data set, wherein Layers 2 through N use weights updated from the plurality of gradients as synchronized in iteration (i−1), and Layer 1 uses weights updated from the plurality of gradients as synchronized in iteration (i−2).

11. The system of claim 8, wherein the one or more processors are further configured to:
- perform the forward computation and the backward computation for a current iteration i of the training data set, the plurality of gradients used for updating weights for the forward computation and the backward computation are synchronized in iteration (i−2).

12. The system of claim 8, wherein the one or more processors are further configured to:
- perform the forward computation and the backward computation for a current iteration i of the training data set, the plurality of gradients used for updating weights for the forward computation and the backward computation are synchronized in iteration (i−1).

13. The system of claim 12, wherein the one or more processors are further configured to:
- perform the forward computation and the backward computation for a subsequent iteration (i+1) of the training data set, subsequent to completion of the synchronizing of the plurality of gradients.

14. The system of claim 8, wherein to synchronizing the plurality of gradients, the one or more processors are further configured to:
- perform gradient aggregation using the plurality of gradients to generate aggregated gradients; and
- update the neural network model using the aggregated gradients.

15. A computer-readable medium storing computer instructions for training a neural network model, wherein the instructions when executed by one or more processors of a worker machine of a plurality of worker machines coupled in a ring topology of a deep-learning training architecture (DLTA), cause the one or more processors to perform the following steps:
- decoding a configuration instruction received by the worker machine from a DLTA function management circuit of the DLTA, and the configuration instruction communicated to the plurality of worker machines to indicate the neural network model for a distributed synchronous training;
- performing, by the worker machine of the plurality of worker machines, a forward computation of a training data set using a plurality of N layers of the neural network model, the forward computation starting at Layer 1 and proceeding through Layer N of the neural network model, at least one layer of the plurality of N layers of the neural network model configured with weights updated from gradients synchronized in a previous iteration;
- performing a backward computation of the training data set, the backward computation starting at Layer N and proceeding through Layer 1 of the neural network model; and
- synchronizing, with other worker machines of the plurality of worker machines and in parallel with the backward computation, a plurality of gradients outputted by the neural network model during the backward computation based on a synchronization instruction received from a gradient management circuit of the DLTA the synchronization instruction causing initiation of the synchronizing based on synchronization of Layer N gradients once the backward computation of the Layer N has completed.

16. The computer-readable medium of claim 15, wherein the instructions further cause the one or more processors to perform the following steps:
- performing the forward computation and the backward computation for a current iteration i of the training data set, wherein Layers 2 through N use weights updated from the plurality of gradients as synchronized in iteration (i−1), and Layer 1 uses weights updated from the plurality of gradients as synchronized in iteration (i−2).

17. The computer-readable medium of claim 15, wherein the instructions further cause the one or more processors to perform the following steps:

performing the forward computation and the backward computation for a current iteration i of the training data set, wherein a first portion of the plurality of gradients are synchronized in iteration (i−1), and a second remaining portion of the plurality of gradients are synchronized in iteration (i−2).

18. The computer-readable medium of claim 15, wherein the instructions further cause the one or more processors to perform the following steps:

performing the forward computation and the backward computation for a current iteration i of the training data set, wherein the plurality of gradients used for updating weights for the forward computation and the backward computation are synchronized in iteration (i−2) or iteration (i−1).

19. The computer-readable medium of claim 15, wherein the instructions further cause the one or more processors to perform the following steps:

performing gradient aggregation using the plurality of gradients to generate aggregated gradients;

averaging the aggregated gradients to generate averaged gradients;

updating a plurality of weights of the neural network model using the averaged gradients; and performing parallel updating of the neural network model by updating the plurality of weights using the averaged gradients in parallel with the backward computation of the training data set.

* * * * *

UNITED STATES PATENT AND TRADEMARK OFFICE
CERTIFICATE OF CORRECTION

| | | |
|---|---|---|
| PATENT NO. | : 12,430,560 B2 | Page 1 of 1 |
| APPLICATION NO. | : 17/450055 | |
| DATED | : September 30, 2025 | |
| INVENTOR(S) | : Zang et al. | |

It is certified that error appears in the above-identified patent and that said Letters Patent is hereby corrected as shown below:

In the Claims

In Column 24, Line 19, in Claim 1, delete "layer" and insert --Layer-- therefor

In Column 25, Line 50, in Claim 9, delete "(1-2)." and insert --(i-2).-- therefor Signed and Sealed this
Twenty-fifth Day of November, 2025

John A. Squires
*Director of the United States Patent and Trademark Office*